(12) United States Patent
Tao et al.

(10) Patent No.: US 11,973,604 B2
(45) Date of Patent: Apr. 30, 2024

(54) USER EQUIPMENT AND BASE STATION INVOLVED IN TRANSMISSION OF DATA

(71) Applicant: Panasonic Intellectual Property Corporation of America, Torrance, CA (US)

(72) Inventors: Ming-Hung Tao, Frankfurt am Main (DE); Rikin Shah, Langen (DE); Hidetoshi Suzuki, Kanagawa (JP); Ankit Bhamri, Frankfurt (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 113 days.

(21) Appl. No.: 17/088,194

(22) Filed: Nov. 3, 2020

(65) Prior Publication Data

US 2021/0075547 A1    Mar. 11, 2021

Related U.S. Application Data

(63) Continuation of application No. PCT/EP2019/073973, filed on Sep. 9, 2019.

(30) Foreign Application Priority Data

Sep. 25, 2018  (EP) .................... 18196683

(51) Int. Cl.
*H04L 1/1867* (2023.01)
*H04L 1/1607* (2023.01)
*H04W 28/10* (2009.01)

(52) U.S. Cl.
CPC ............ *H04L 1/187* (2013.01); *H04L 1/1685* (2013.01); *H04L 1/188* (2013.01); *H04W 28/10* (2013.01)

(58) Field of Classification Search
None
See application file for complete search history.

(56) References Cited

U.S. PATENT DOCUMENTS

| | | | |
|---|---|---|---|
| 6,778,509 B1 | 8/2004 | Ravishankar et al. | |
| 7,505,412 B2 | 3/2009 | Miyake et al. | |

(Continued)

FOREIGN PATENT DOCUMENTS

| | | |
|---|---|---|
| CN | 1512710 A | 7/2004 |
| CN | 1771686 A | 5/2006 |

(Continued)

OTHER PUBLICATIONS

3GPP TR 38.801 V14.0.0, "$3^{rd}$ Generation Partnership Project; Technical Specification Group Radio Access Network; Study on new radio access technology; Radio access architecture and interfaces (Release 14)," Mar. 2017, 91 pages.

(Continued)

*Primary Examiner* — Marcus Smith
(74) *Attorney, Agent, or Firm* — Seed IP Law Group LLP

(57) ABSTRACT

The present disclosure relates to a user equipment (UE) which comprises a transmitter that transmits at least one data packet based on a transmitting window having a transmitting window size. A receiver of the UE receives reception feedback regarding the at least one transmitted data packet. Processing circuitry of the UE determines, based on at least the received reception feedback, whether to change the transmitting window size for the transmitting window to be used at least for transmitting further data packets.

15 Claims, 9 Drawing Sheets

(56) References Cited

U.S. PATENT DOCUMENTS

| | | | |
|---|---|---|---|
| 7,729,719 | B2 | 6/2010 | Bergstrom et al. |
| 8,274,996 | B1* | 9/2012 | Yuan ............... H04L 1/1887 |
| | | | 370/473 |
| 10,880,223 | B1* | 12/2020 | Peden ............... H04L 47/365 |
| 2004/0190540 | A1 | 9/2004 | Miyake et al. |
| 2009/0221242 | A1 | 9/2009 | Bergstrom et al. |
| 2010/0260049 | A1 | 10/2010 | Racz et al. |
| 2011/0090793 | A1 | 4/2011 | Halfmann et al. |
| 2015/0036511 | A1* | 2/2015 | Cheng ............... H04W 24/00 |
| | | | 370/242 |
| 2017/0086225 | A1* | 3/2017 | Ljung ............... H04W 16/14 |
| 2018/0115347 | A1* | 4/2018 | Yerramalli ........ H04W 72/0413 |
| 2018/0152267 | A1* | 5/2018 | Andreoli-Fang ......... H04L 1/08 |
| 2018/0254858 | A1* | 9/2018 | He ................ H04L 1/1657 |
| 2019/0020572 | A1* | 1/2019 | Hu ................ H04L 1/187 |
| 2019/0199643 | A1* | 6/2019 | Skarve ............ H04W 28/0284 |
| 2019/0260609 | A1* | 8/2019 | Zhang ............. H04L 1/187 |
| 2019/0327064 | A1* | 10/2019 | Hosseini ............. H04L 27/26 |
| 2020/0044978 | A1* | 2/2020 | Lei ................ H04L 5/0057 |
| 2020/0177318 | A1* | 6/2020 | Belleschi .......... H04W 76/28 |
| 2020/0288498 | A1* | 9/2020 | Li ................ H04W 72/0453 |
| 2020/0294389 | A1* | 9/2020 | Gilson ............. H04W 74/0816 |
| 2020/0344819 | A1* | 10/2020 | Myung ............ H04W 74/0841 |
| 2021/0167901 | A1* | 6/2021 | Tang ............... H04W 72/0446 |

FOREIGN PATENT DOCUMENTS

| | | |
|---|---|---|
| CN | 106330412 A | 1/2017 |
| EP | 1434380 A1 | 6/2004 |
| EP | 1 648 183 A1 | 4/2006 |
| JP | 2004222271 A | 8/2004 |
| JP | 2011188429 A | 9/2011 |
| WO | 2018/145787 A1 | 8/2018 |

OTHER PUBLICATIONS

3GPP TR 38.804 V14.0.0, "$3^{rd}$ Generation Partnership Project; Technical Specification Group Radio Access Network; Study on New Radio Access Technology; Radio Interface Protocol Aspects (Release 14)," Mar. 2017, 57 pages.

3GPP TR 38.874 V0.4.0, "$3^{rd}$ Generation Partnership Project; Technical Specification Group Radio Access Network; Study on Integrated Access and Backhaul; (Release 15)," Aug. 2018, 55 pages.

3GPP TR 38.913 V15.0.0, "$3^{rd}$ Generation Partnership Project; Technical Specification Group Radio Access Network; Study on Scenarios and Requirements for Next Generation Access Technologies; (Release 15)," Jun. 2018, 39 pages.

3GPP TS 38.211 V15.2.0, "$3^{rd}$ Generation Partnership Project; Technical Specification Group Radio Access Network; NR; Physical channels and modulation (Release 15)," Jun. 2018, 96 pages.

3GPP TS 38.300 V15.2.0, "$3^{rd}$ Generation Partnership Project; Technical Specification Group Radio Access Network; NR; NR and NG-RAN Overall Description; Stage 2 (Release 15)," Jun. 2018, 87 pages.

3GPP TS 38.322 V15.2.0, "$3^{rd}$ Generation Partnership Project; Technical Specification Group Radio Access Network; NR; Radio Link Control (RLC) protocol specification (Release 15)," Jun. 2018, 33 pages.

Extended European Search Report dated Mar. 15, 2019, for European Application No. 18196683.9, 22 pages.

International Search Report, dated Oct. 8, 2019, for International Application No. PCT/EP2019/073973, 3 pages.

Japanese Notice of Reasons for Rejection, dated Aug. 15, 2023, for Japanese Patent Application No. 2020-571631. (23 pages) (with English translation).

English Translation of Chinese Office Action, dated Sep. 26, 2023, for Chinese Patent Application No. 201980041563.6. (22 pages).

* cited by examiner

| | | | | | | | | |
|---|---|---|---|---|---|---|---|---|
| D/C | CPT | | | ACK_SN | | | | Oct 1 |
| ACK_SN | | | | | | | | Oct 2 |
| E1 | R | R | R | R | R | R | R | Oct 3 |
| NACK_SN | | | | | | | | Oct 4 |
| NACK_SN | | | | E1 | E2 | E3 | R | Oct 5 |
| NACK_SN | | | | | | | | Oct 6 |
| NACK_SN | | | | E1 | E2 | E3 | R | Oct 7 |
| SOstart | | | | | | | | Oct 8 |
| SOstart | | | | | | | | Oct 9 |
| SOend | | | | | | | | Oct 10 |
| SOend | | | | | | | | Oct 11 |
| NACK range | | | | | | | | Oct 12 |
| NACK_SN | | | | | | | | Oct 13 |
| NACK_SN | | | | E1 | E2 | E3 | R | Oct 14 |

Status PDU with 12-bit Sequence number (SN)

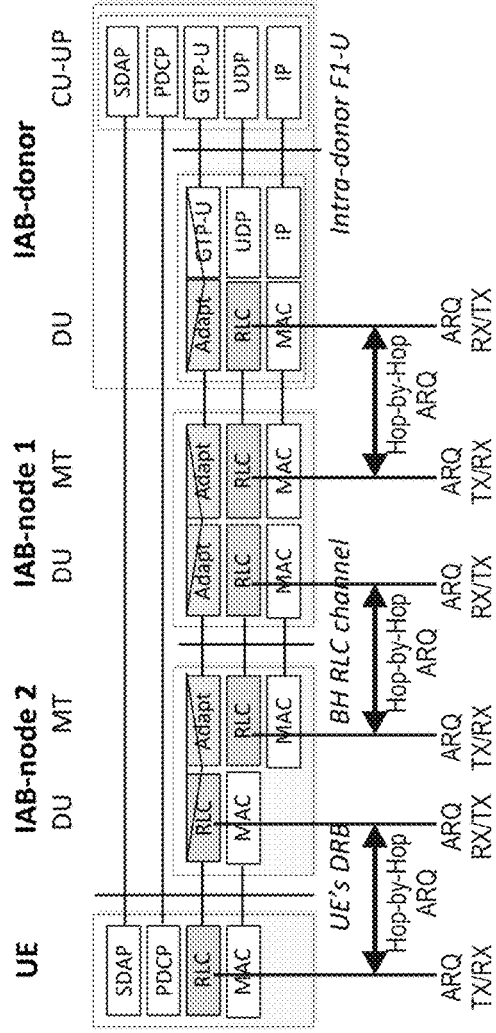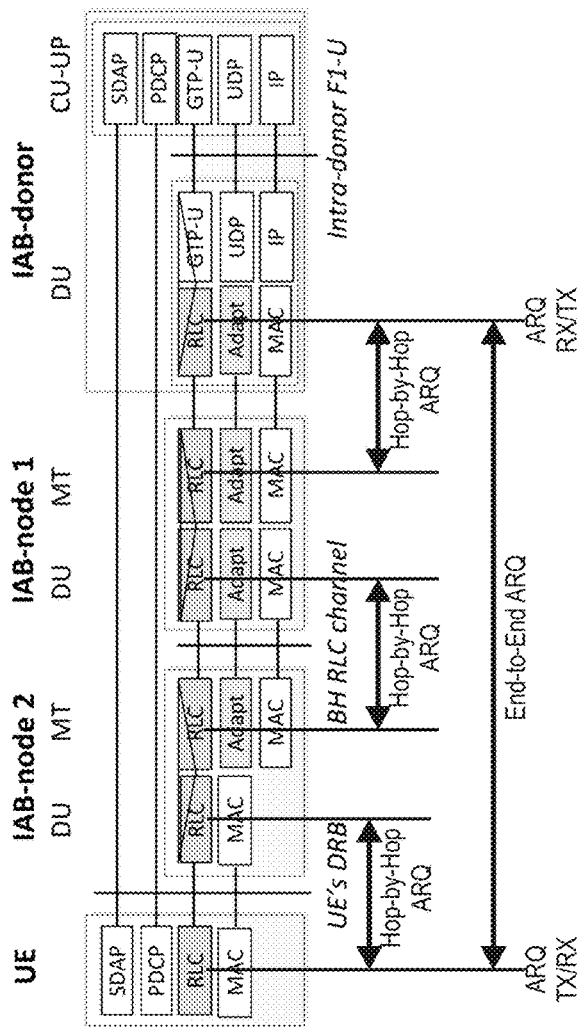

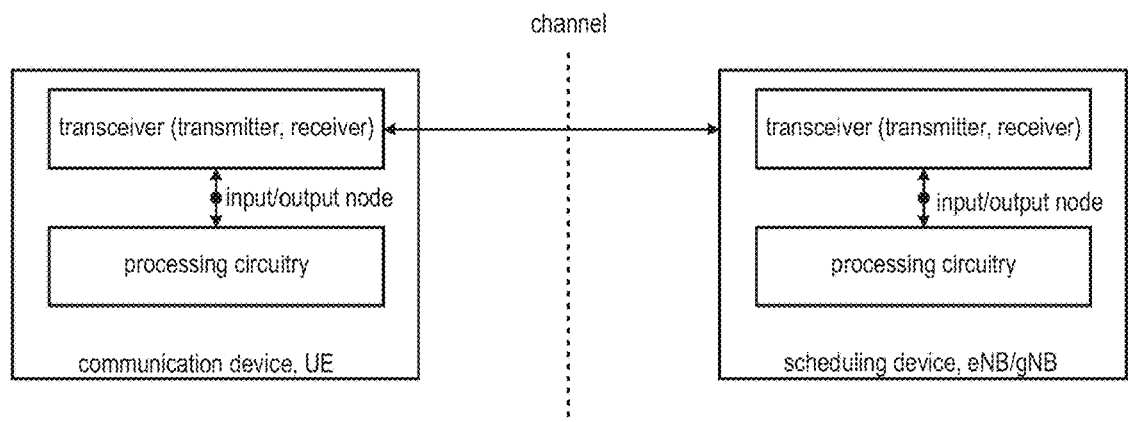
Fig. 16
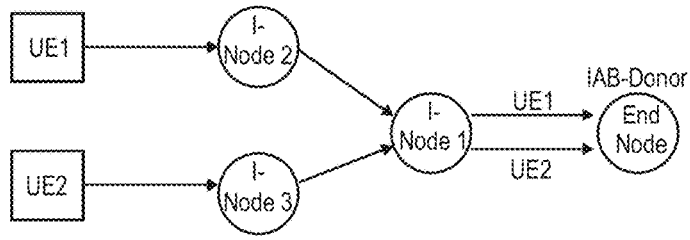
Fig. 17
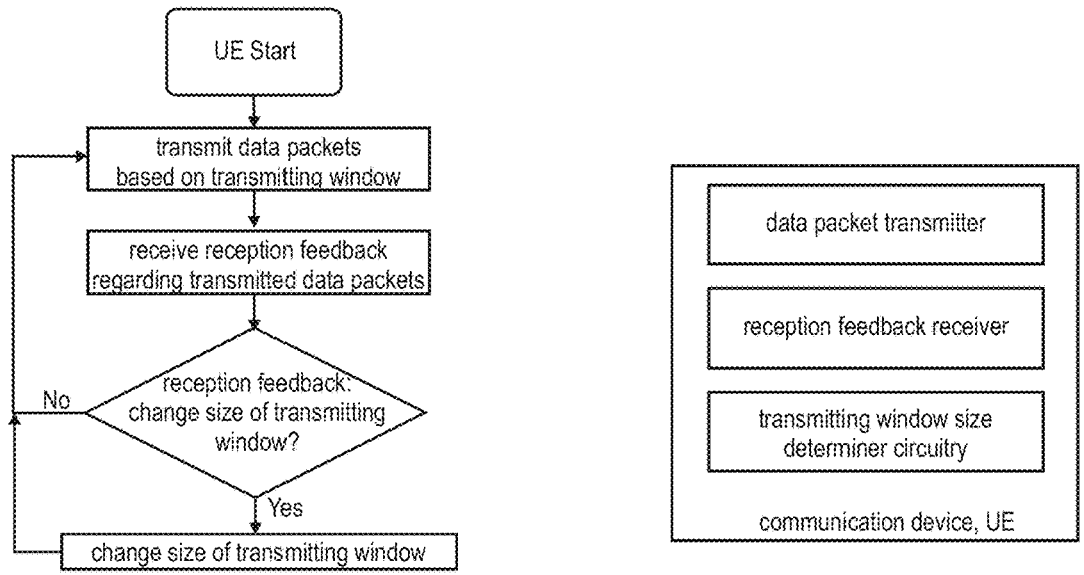
Fig. 18
Fig. 19

USER EQUIPMENT AND BASE STATION INVOLVED IN TRANSMISSION OF DATA

BACKGROUND

Technical Field

The present disclosure is directed to methods, devices and articles in communication systems, such as 3GPP communication systems.

Description of the Related Art

Currently, the 3rd Generation Partnership Project (3GPP) works at the technical specifications for the next generation cellular technology, which is also called fifth generation (5G).

One objective is to provide a single technical framework addressing all usage scenarios, requirements and deployment scenarios (see, e.g., section 6 of TR 38.913 version 15.0.0 incorporated herein by reference), at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC deployment scenarios may include scenarios with large number of devices with non-time critical data transfers such as smart wearables and sensor networks. The services eMBB and URLLC are similar in that they both demand a very broad bandwidth, however are different in that the URLLC service may preferably require ultra-low latencies.

A second objective is to achieve forward compatibility. Backward compatibility to Long Term Evolution (LTE, LTE-A) cellular systems is not required, which facilitates a completely new system design and/or the introduction of novel features.

The physical layer signal waveform will likely be based on OFDM, with potential support of a non-orthogonal waveform and multiple access. For instance, additional functionality on top of OFDM such as DFT-S-OFDM, and/or variants of DFT-S-OFDM, and/or filtering/windowing is further considered. In LTE, CP-based OFDM and DFT-S-OFDM are used as waveform for downlink and uplink transmission, respectively. One of the design targets in NR is to seek a common waveform as much as possible for downlink, uplink and sidelink.

BRIEF SUMMARY

Non-limiting and exemplary embodiments facilitate providing improved procedures to transmit data.

In one general first example, the techniques disclosed here feature a user equipment comprising a receiver, transmitter and processing circuitry according to the following. The transmitter transmits at least one data packet based on a transmitting window having a transmitting window size. The receiver receives reception feedback regarding the at least one transmitted data packet. The processing circuitry determines, based on at least the received reception feedback, whether to change the transmitting window size for the transmitting window to be used at least for transmitting further data packets.

In one general first example, the techniques disclosed here feature a method comprising the following steps performed by a user equipment. The steps include:
transmitting at least one data packet based on a transmitting window having a transmitting window size,
receiving reception feedback regarding the at least one transmitted data packet,
determining, based on at least the received reception feedback, whether to change the transmitting window size for the transmitting window to be used at least for transmitting further data packets.

In one general first example, the techniques disclosed here feature a serving base station comprising a receiver and processing circuitry as well as a transmitter according to the following. The transmitter transmits at least one data packet based on a transmitting window having a transmitting window size. The receiver receives reception feedback regarding the at least one transmitted data packet. The processing circuitry determines, based on at least the received reception feedback, whether to change the transmitting window size for the transmitting window to be used at least for transmitting further data packets.

It should be noted that general or specific embodiments may be implemented as a system, a method, an integrated circuit, a computer program, a storage medium, or any selective combination thereof.

Additional benefits and advantages of the disclosed embodiments and different implementations will be apparent from the specification and figures. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following exemplary embodiments are described in more detail with reference to the attached figures and drawings.

FIGS. 8 and 9 illustrate example user plane protocol architectures for the architecture group 1, FIG. 16 illustrates the exemplary and simplified structure of a UE and a gNB, FIG. 17 illustrates an exemplary uplink data traffic route scenario, FIG. 18 is a flow diagram for the behavior of a transmitting side, here exemplary the UE, according to an exemplary implementation of an embodiment, FIG. 19 illustrates a structure of the UE according to an exemplary implementation of an embodiment.

DETAILED DESCRIPTION

5G NR System Architecture and Protocol Stacks

As presented in the background section, 3GPP is working at the next release for the 5$^{th}$ generation cellular technology, simply called 5G, including the development of a new radio access technology (NR) operating in frequencies ranging up to 100 GHz. 3GPP has to identify and develop the technology components needed for successfully standardizing the NR system timely satisfying both the urgent market needs and the more long-term requirements. In order to achieve this, evolutions of the radio interface as well as radio network architecture are considered in the study item "New Radio Access Technology." Results and agreements are collected in the Technical Report TR 38.804 v14.0.0, incorporated herein in its entirety by reference.

Figure 1:
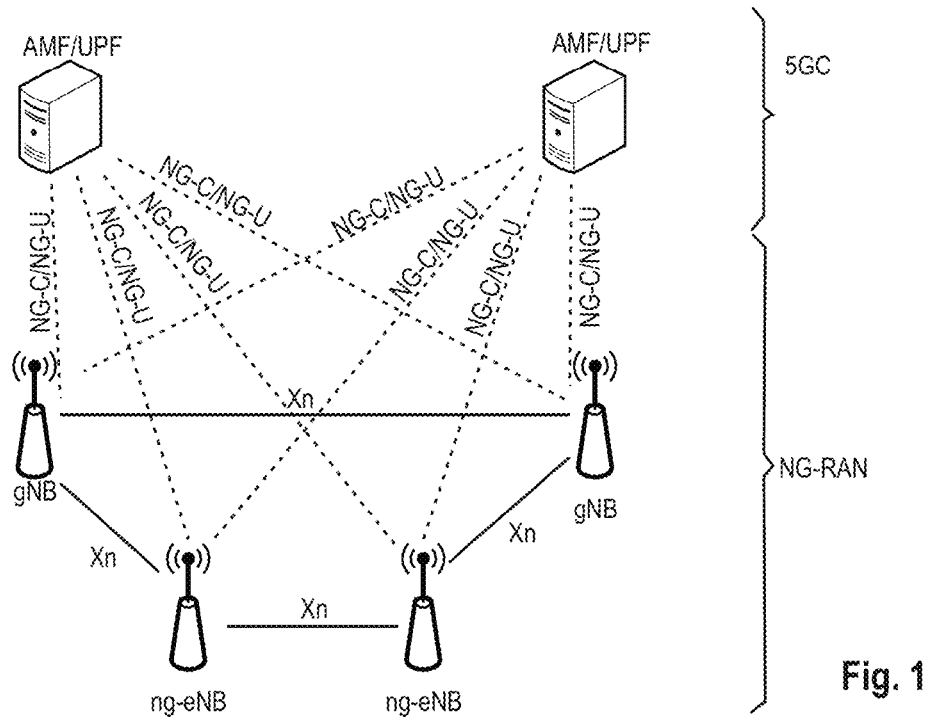
FIG. 1 shows an exemplary architecture for a 3GPP NR system.

Among other things, the overall system architecture assumes an NG-RAN (Next Generation-Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see, e.g., 3GPP TS 38.300 v15.2.0, section 4 incorporated herein by reference).

Figure 2:
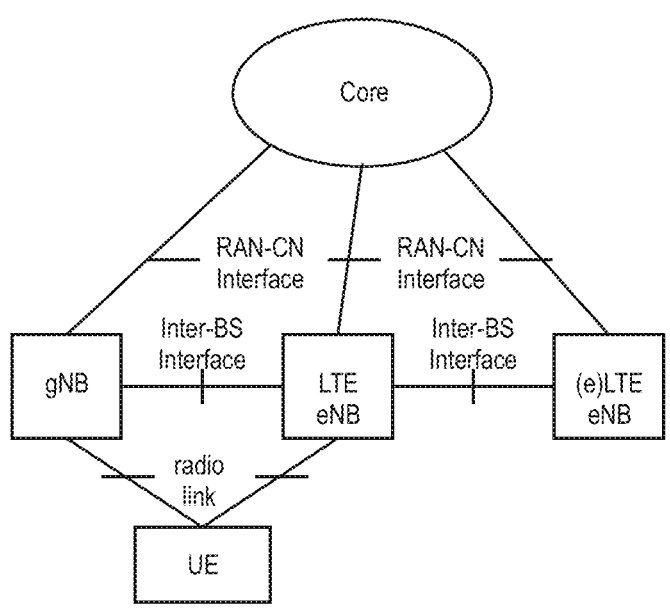
FIG. 2 shows an exemplary user and control plane architecture for the LTE eNB, gNB, and UE.

Various different deployment scenarios can be supported (see, e.g., 3GPP TR 38.801 v14.0.0 incorporated herein by reference). For instance, a non-centralized deployment scenario (see, e.g., section 5.2 of TR 38.801; a centralized deployment is illustrated in section 5.4) is presented therein, where base stations supporting the 5G NR can be deployed. FIG. 2 illustrates an exemplary non-centralized deployment scenario (see, e.g., FIG. 5.2.-1 of said TR 38.801), while additionally illustrating an LTE eNB as well as a user equipment (UE) that is connected to both a gNB and an LTE eNB. The new eNB for NR 5G may be exemplarily called gNB. An eLTE eNB is the evolution of an eNB that supports connectivity to the EPC (Evolved Packet Core) and the NGC (Next Generation Core).

The user plane protocol stack for NR (see, e.g., 3GPP TS 38.300 v15.2.0, section 4.4.1 incorporated herein by reference) comprises the PDCP (Packet Data Convergence Protocol), RLC (Radio Link Control) and MAC (Medium Access Control) sublayers, which are terminated in the gNB on the network side. Additionally, a new access stratum (AS) sublayer (SDAP, Service Data Adaptation Protocol) is introduced above PDCP (see, e.g., sub-clause 6.5 of 3GPP TS 38.300 version 15.2.0 incorporated herein by reference). For more information on the control plane protocol stack for NR, see for instance TS 38.300, section 4.4.2. An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300. The mentioned sections of TS 38.300 are incorporated herein by reference.

The new NR layers exemplarily assumed for the 5G systems may be based on the user plane layer structure currently used in LTE(-A) communication systems.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-10$^{-5}$ within 1ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f=1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain. Some definitions have already been achieved as apparent from 3GPP TS 38.211 v15.2.0 incorporated herein by reference.

ARQ (Automatic Repeat reQuest) in the RLC Layer

The RLC layer has an AM RLC entity (Acknowledge Mode RLC entity) entrusted with different functions (see, e.g., RLC, Radio Link Control, protocol specification 3GPP TS 38.322 version 15.2.0, incorporated herein by reference).

For an RLC entity configured at the gNB, there is a peer RLC entity configured at the UE and vice versa. In particular, the AM RLC entity comprises a transmitting side and a receiving side. The transmitting side of an AM RLC entity receives RLC SDUs from upper layer and sends RLC PDUs to its peer AM RLC entity via lower layers. The receiving side of an AM RLC entity delivers RLC SDUs to upper layer and receives RLC PDUs from its peer AM RLC entity via lower layers.

Figure 3:
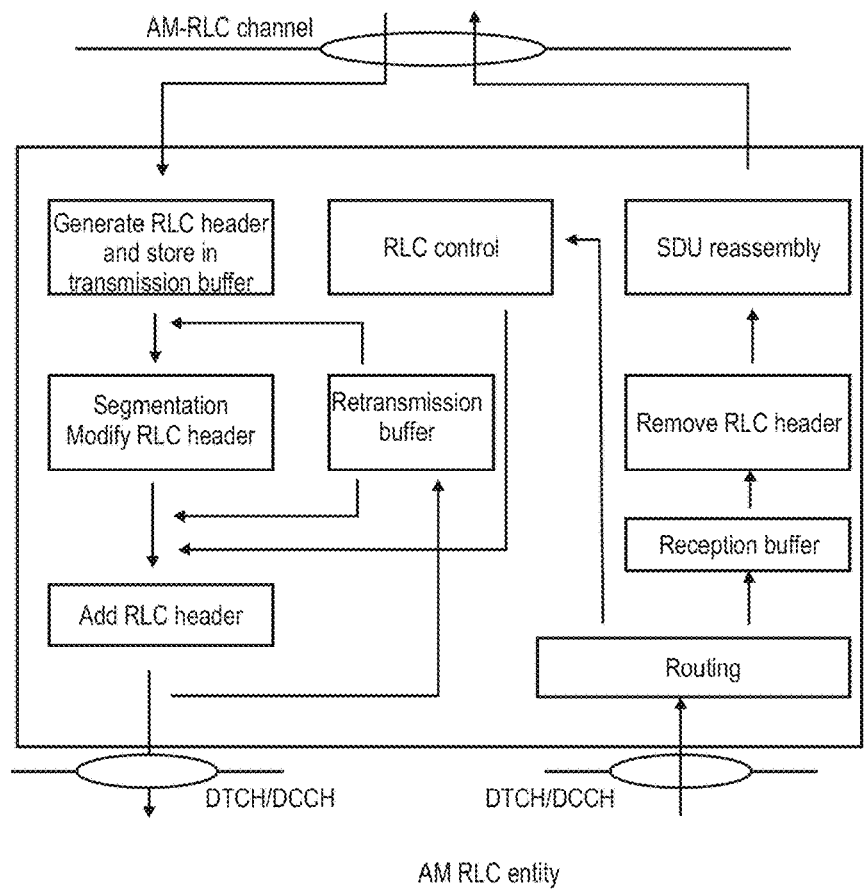
FIG. 3 illustrates a simplified and exemplary model of the AM RLC entity.

FIG. 3 shows a simplified and exemplary model of the AM RLC entity (see, e.g., TS 38.322 version 15.2.0 section 4.2.1.3). As apparent from the figure, RLC PDUs are transmitted and received through the logical channels DL/UL DCCH (Dedicated Control CHannel) or DL/UL DTCH (Dedicated Traffic CHannel).

The AM data transfer of the RLC layer involves the use of a transmitting window (see, e.g., TS 38.322 version 15.2.0 section 5.2.3 "AM data transfer," including the transmit and receive operations, incorporated herein by reference). In particular, the transmitting side of an AM RLC entity maintains a transmitting window to control (and limit) the transmission of RLC PDUs depending on whether or not the Sequence Number (SN) falls within or outside the transmitting window. For example, an RLC PDU (with an SN) that falls outside the transmitting window is not transmitted, whereas an RLC PDU (with an SN) that is inside the transmitting window can be transmitted. The size of the transmitting window is given by a parameter (e.g., named AM_Window_Size) which can be fixed and can be set to 2048 (e.g., when using a 12 bit sequence number) or 131072 (e.g., when using an 18 bit SN is used) (see, e.g., 3GPP TS 38.322 version 15.2.0 section 7.2 "Constants," incorporated herein by reference).

Figure 4:
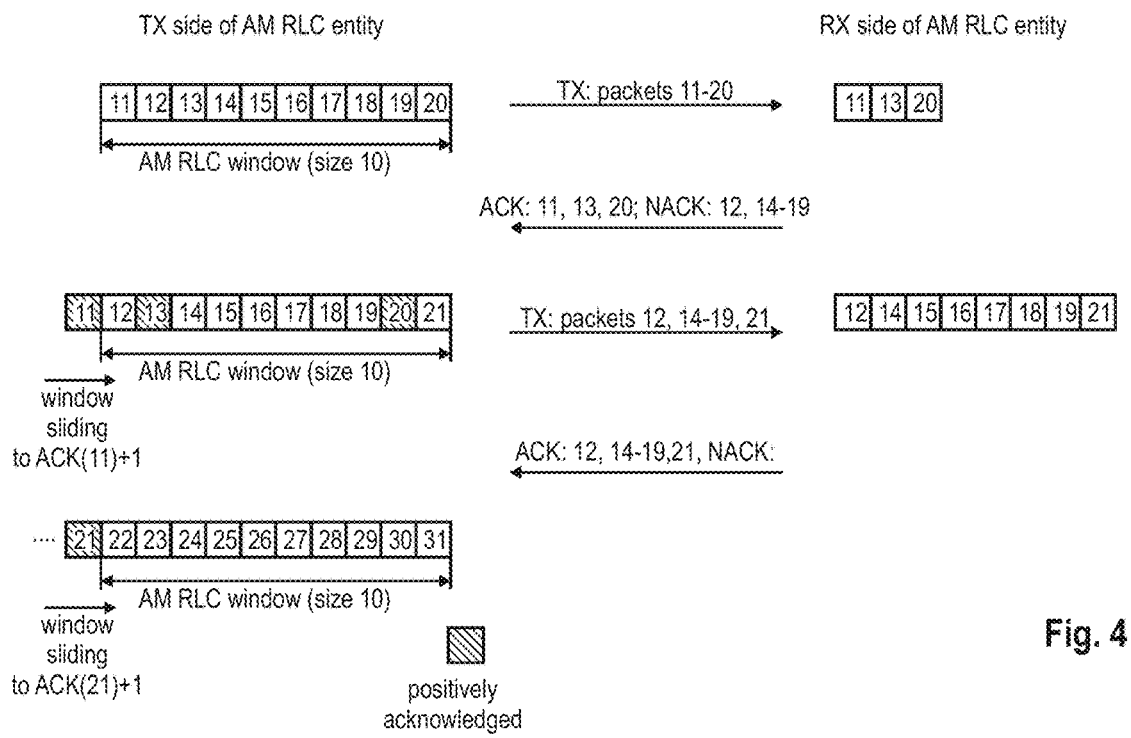
FIG. 4 illustrates the AM data transfer at the RLC layer.

The AM data transfer at the RLC layer is illustrated in a simplified and exemplary manner in FIG. 4. For illustration purposes, it is assumed that the size of the transmitting window is 10 PDUs. The transmitting window thus limits the amount of PDUs (could also be exemplarily termed in this context data packets) that can be transmitted, without receiving a positive acknowledgement for a previously transmitted data packet, to 10 PDUs. The transmitting window can be a sliding window, which is moved forward upon receiving the positive acknowledgement for the PDU at the lower edge of the transmitting window. Consequently, the lower edge corresponds to the PDU with the SN that follows the last in-sequence completely received RLC PDUs. In the chosen example, the PDUs with SN 11-20 are placed in the transmitting window and can be transmitted to receiving side. Further assuming that only PDUs with SN 11, 13 and 20 are successfully received at the receiving side (the remaining PDUs with SN 12, 14-19 could not be decoded successfully, e.g., because they are lost on the radio link).

As will be explained in more detail later, the AM RLC layer includes an error correction mechanism, named ARQ, which allows to provide reception feedback to the transmitting side (e.g., ACK and/or NACK) and allows the transmitting side to perform retransmissions for those PDUs that are negatively acknowledged.

In FIG. 4 the transmitting window is slid by one PDU because of the ACK received for SN=11, which is the lower edge of the transmitting window at that time. Consequently, the PDU with SN=21 now falls within the transmitting window (SN=12-SN=21) and can be transmitted to the receiving side, e.g., together with the retransmissions of PDUs with SN=12, 14-19.

An error correction function is implemented by the RLC layer using ARQ (Automatic Repeat reQuest). In particular, the transmitting side of an RLC entity supports retransmissions of data, and the receiving side of an RLC entity in turn supports the detection of loss of data at lower layers and the requesting of retransmissions to its peer RLC entity (see, e.g., TS 38.322 version 15.2.0 section 5.3 "ARQ procedures," incorporated herein by reference). The ARQ functionality is based on a STATUS message (also termed e.g., status report), transmitted by the receiving side to the transmitting side of the RLC layer. The STATUS message may include positive and/or negative acknowledgements for the RLC PDUs (a notification of reception failure and reception success). The STATUS message may provide feedback of the unsuccessful and/or successful reception of the RLC PDUs, allowing the transmitting side to at least identify which of the RLC PDUs were successfully transmitted to the receiving RLC side and which were not.

Figures 5, 6:
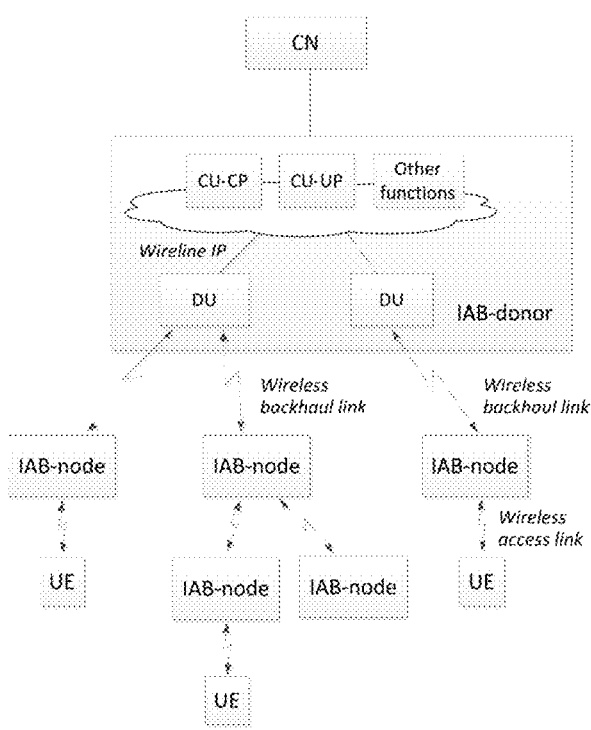
FIG. 5 illustrates an exemplary RLC Status report, when using 12-bit sequence numbers.
FIG. 6 is a diagram for the integrated access backhaul, comprising an IAB donor, intermediate IAB nodes and UEs.

One example of a Status report includes the sequence numbers of negatively acknowledged RLC PDU (NACK_SN) as well as one sequence number for the positive acknowledgement (ACK_SN), wherein the ACK_SN is set to the sequence number of the next not received RLC SDU which is not indicated as missing in the resulting Status report (cumulative acknowledgement). The transmitting side of the RLC entity interprets the Status report such that all RLC SDUs up to but not including the RLC SDU with SN=ACK_SN have been received by its peer RLC entity, excluding those RLC SDUs indicated in the Status report with NACK_SN. An example of such a Status report is illustrated in FIG. 5, based on the assumption that sequence numbers with 12 bits are used for communication (see, e.g., TS 38.322 version 15.2.0, sections 5.3.4, 6.2.3.10-6.2.3.17, incorporated herein by reference)

The transmitting RLC entity can poll its peer RLC entity in order to trigger the transmission of a RLC STATUS message for obtaining the reception feedback (reception status, such as success or not) of the transmitted RLC PDUs. The RLC Status polling can be triggered by different conditions, such as one or more of the following:
- the number of PDUs already transmitted after the last polling,
- the number of Bytes already transmitted after the last polling,
- the last PDU in the transmission buffer is transmitted,
- expiry of a poll retransmission timer, indicating a time after the last polling,
- when ARQ window stalling occurs.

The RLC status message is polled (requested) by setting a corresponding field in an AMD PDU accordingly (e.g., an 1-bit P field set to the value "1"; P field set to the value "0" would mean that a Status report is not requested) and transmitting the AMD PDU to the receiving side.

Correspondingly, the receiving side of the RLC entity transmits a STATUS report to its peer RLC entity (transmitting side) upon receiving such a polling request, the Status report containing the reception status of the PDUs whose sequence numbers are less than or equal to the received AMD PDU with the polling bit set.

IAB—Integrated Access and Backhaul in 5G

Millimeter-wave-based cellular access, which provides a higher spatial reuse and achieves a higher bandwidth, is an integral part of the new 5G NR. However, millimeter-wave-based cellular access is mainly feasible for small cell networks, because signals transmitted via the millimeter wave band suffer from high path loss. Providing wired backhaul to many small cells may increase the costs and complexity of the deployment. On the other hand, a wireless backhaul facilitates the network operators to flexibly deploy small cell base station without incurring any additional fiber deployment costs and further facilitates an incremental deployment in the early stages of a network rollout. In particular, fiber can be deployed to a subset of base station (anchor nodes), and the access traffic of the remaining base stations can be wirelessly backhauled to the anchor nodes.

Integrated access and backhaul (IAB) is a technique to implement a wireless backhaul, where the access and the backhaul communications use the same standard radio technology (e.g., 5G NR), thereby allowing interoperability among different base stations from different manufacturers which is an important criteria for the flexible deployment of dense cell networks. IAB can be deployed through both in-band and out-of-band relaying and can be used in both indoor and outdoor networks.

IAB can support stand-alone (SA) and non-stand-alone (NSA) deployments, wherein the IAB node can operate in SA or NSA mode. Multi-Hop backhauling provides more range extension than single hop and is especially beneficial for above 6-GHz frequencies due to their limited range. The maximum number of hops in a deployment is expected to depend on many factors, such as frequency, cell density, propagation environment and traffic load.

FIG. 6 shows an exemplary reference diagram for the integrated access backhaul, containing one IAB-donor and multiple IAB nodes as well as UEs that can connect to the different nodes thereby establishing data traffic routes with two or more hops. For instance, the IAB donor can be seen as the single logical node that comprises a set of functions similar to a base station (serving base station, gNB).

Different layer 2 (L2) and layer 3 (L3) relay architectures are possible, differing e.g., with respect to the modifications needed on the interfaces and/or additional functionality needed, e.g., to accomplish the multi-hop forwarding. The architectures can be divided into two architecture groups, with Architecture group 1 leveraging the Central Unit (CU)/Distributed Unit (DU) split in the IAB Donor and Architecture group 2 in which hop-by-hop forwarding across intermediate nodes uses higher-layer User Plane protocols (e.g., GTP-U, UDP, or IP nested tunneling).

It should be noted that the presence of intermediate nodes may be transparent to the UE, i.e., the UE does not know that there are intermediate nodes in between the UE and the IAB donor (serving base station).

Figure 7:
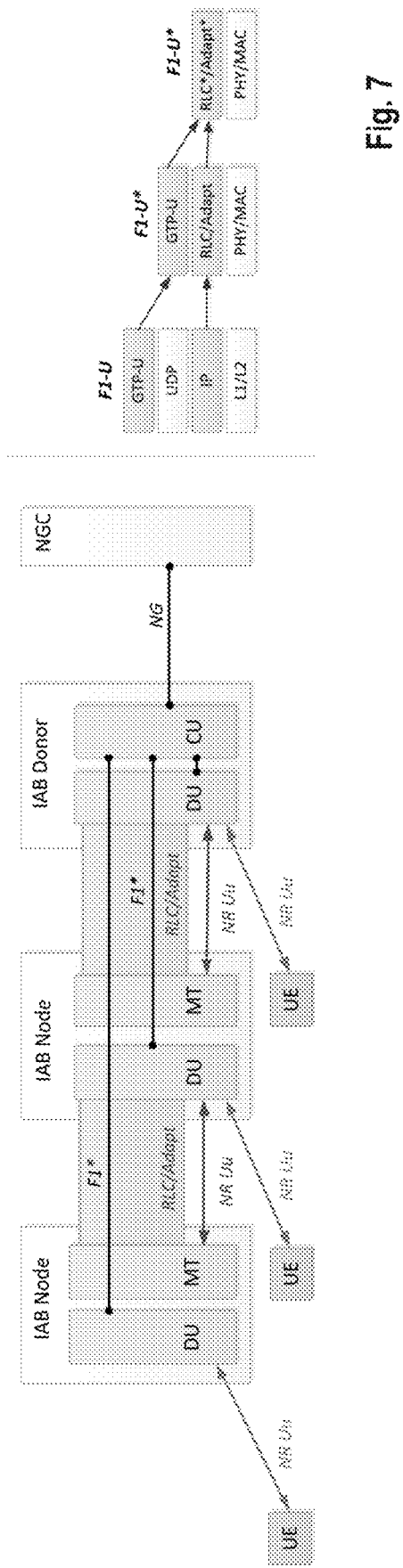
FIG. 7 illustrates the architecture option 1$a$ for IAB scenarios.

Architecture 1a of the first architecture group uses an adaptation layer or a GTP-U combined with an adaptation layer for backhauling of the F1-U. FIG. 7 exemplarily illustrates the architecture option 1a (see, e.g., TR 38.874 version 0.4.0, section 6.3.1.1, incorporated herein by reference). For architecture group 1, several user-plane aspects can be considered, such as the placement of an adaptation layer, the functions to be supported by the adaptation layer, support of multi-hop RLC, impacts on scheduler and QoS etc. In order to select one single user-plane protocol architecture, trade-offs are likely to occur between these various aspects. FIGS. 8 and 9 illustrate example user plane protocol architectures for the architecture group 1 (see, e.g., TR 38.874 version 0.4.0, section 8.2.1, incorporated herein by reference). As apparent therefrom, it is exemplarily assumed that the Layer2-relaying is performed using the adaptation layer (instead of using a GTP-U combined with an adaptation layer), the adaptation layer being exemplarily placed above the RLC layer or above the MAC layer. Further, it is exemplarily assumed that the RLC layer is not split between the RLC ARQ function and other function(s) (such as the RLC segmentation). However, this user-plane protocol architecture is only one among many different options that can be equally considered in this application.

The adaption layer (exemplary "Adapt" in the figures) may support different functions (see, e.g., TR 38.874 version 0.4.0, section 8.2.2 "Adaptation Layer," incorporated herein by reference). In the architecture option 1a discussed above, these functions may include one or more of the following:
 Identification of the UE bearer for the PDU
 Routing across the wireless backhaul topology
 QoS enforcement by the scheduler on DL and UL on the wireless backhaul link
 Mapping of UE user-plane PDUs to backhaul RLC channels IAB strives to reuse existing functions and interfaces already defined in 5G NR for access, and modifications or enhancements for these functions and interfaces are to be also identified and defined in addition to additional functionality such as multi-hop forwarding.

As identified by the inventors, an improved RLC ARQ design can be defined for the Integrated Access and Backhaul scenarios. Generally, ARQ can be divided into End-to-End (E2E) and Hop-by-Hop (HBH) solutions, but also into other more complicated solutions. Whether E2E or HBH ARQ is used also depends on the protocol architecture that is implemented. The protocol architecture using an above-RLC adaptation layer (see FIG. 8) can support only hop-by-hop ARQ, whereas the protocol architecture using the above-MAC adaptation layer (see FIG. 9) can support both hop-by-hop and end-to-end ARQ. For both adaptation layer placements (above-MAC, above-RLC), RLC ARQ can be pre-processed on the transmitting side (TX side). Other observations can be made with regard to the adaptation layer placement (see, e.g., TR 38.874 version 0.4.0, section 8.2.2, incorporated herein by reference).

End-to-end ARQ is here to be understood in that the RLC ARQ is performed between the two end nodes of the data traffic route, such as the UE and the IAB-donor node. There is only one ARQ process for the entire data traffic route, traversing the intermediate nodes. It should be noted that HARQ (Hybrid ARQ) at the MAC layer can still be used at each hop. Since the RLC ARQ is performed between the two end nodes of the data traffic route (e.g., the UE and the IAB donor), the intermediate nodes simply relay the RLC PDUs as well as the ACK/NACKs (in other direction) towards the destination. In case of a lost packet on any one of the relay hops, the lost packet (NACKed by the receiving side to the transmitting side) has to be retransmitted over all relay hops, which can be considered as being inefficient because the PDU is unnecessarily retransmitted over hops that had already successfully transmitted the PDU before.

Furthermore, in order for the retransmission of a PDU to work for end-to-end ARQ, the reception feedback (e.g., ACK/NACKs) also needs to successfully traverse all relay hops on the way back from the receiver to the transmitter. ACK/NACKs can be transmitted using a status report message (see above discussion regarding RLC ARQ STATUS PDU), for both acknowledging RLC PDUs positively and negatively. As a result, if any such status report message is lost on any one of the relay hops, it could unnecessarily trigger retransmissions of already successfully transmitted PDUs across all relay hops.

On the other hand, in hop-by-hop ARQ the ARQ function is respectively performed between two nodes that are directly next to each other (see, e.g., FIG. 8), i.e., the entities of one hop. Thus, a NACKed PDU can be retransmitted only on that hop for which the negative acknowledgment was determined, which is more efficient than compared to the E2E ARQ option (especially for in-band systems that share the same frequency bandwidth between the wireless radio access and the wireless backhaul links). HBH-ARQ however practically results in that the full RLC layer (to be more precise, at least the RLC ARQ part of it) is deployed at all IAB nodes including not only the IAB-donor but also the intermediate nodes. The intermediate nodes may thus become more complicated and expensive due to the additional ARQ state machine; this may be offset by the benefit that, when a fiber is finally available, the upgrade of an IAB intermediate node to an IAB donor is facilitated.

E2E ARQ and HBH ARQ also differ with respect to their impact on the 3GPP specifications, such as the possible need to extend the sequence number space at the RLC layer in order to accommodate the longer round-trip time (RTT) of multi-hop relay in E2E ARQ or additional functionality in the RLC protocol to alleviate the impact of lost RLC Status reports across multiple hops when using E2E ARQ.

Flow Control in Multi-Hop Data Traffic Routes

In the above discussed multi-hop IAB backhaul scenarios (but also in other usage cases, not directly related with IAB, such as the LTE-A relay deployment), data congestion may occur on one or more of the intermediate nodes. Data congestion can be broadly understood as referring to a scenario in which the incoming data rate for a node is higher than the outgoing data rate. As a result, the buffer inside that node will increase and eventually lead to the buffer overflow and packet dropping. Flow control mechanism may solve or alleviate data congestion. As will explained below, one solution can be to grant less resources to an upstream node (e.g., an intermediate node grants less uplink radio resources to the UE) so as to reduce the incoming data traffic.

For instance, on the uplink, an intermediate IAB node acts as a gNB to other upstream IAB nodes and can control the amount of uplink data from upstream IAB nodes (or UE) by adjusting the UL grant, i.e., the current transmission/scheduling mechanisms control uplink data rate toward an IAB node. This is one mechanism to mitigate congestion in uplink.

On the downlink, the capacity of a link to a (downstream IAB node or a UE may be smaller than the capacity of a backhaul link to the upstream IAB node. The DU (Distribution Unit) side of the upstream IAB node may not know the downlink buffer status of its downstream IAB node, which may result into downlink data congestion and packet discard at this intermediate downstream IAB node. For hop-by-hop ARQ, the discarded PDUs will not be retransmitted, and the PDCP entity on the downstream UE will wait for t-reordering timer before it delivers in-sequence PDUs to upper layers. This delay may have adverse impact on upper layers, e.g., it may cause a TCP slow start. For end-to-end ARQ, the discarded PDUs will be retransmitted on upstream on links where they had already been successfully transmitted before. This unnecessarily consumes backhaul link capacity.

Additional flow control mechanisms to avoid and handle uplink and downlink data congestion can be defined.

FIG. 10-15 illustrate in a simplified and exemplary manner different exemplary congestion scenarios in uplink and downlink, before (left hand side) and after (right hand side) flow control.

Figure 10:
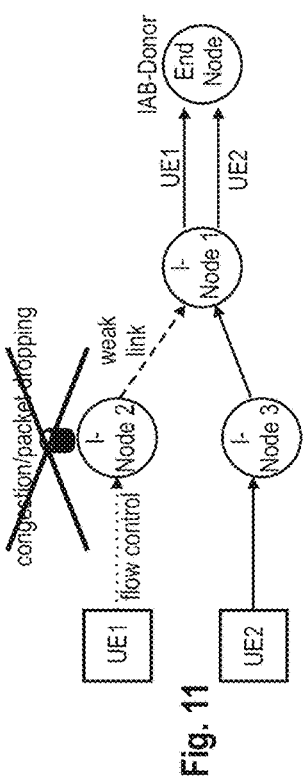
FIG. 10-15 illustrate in a simplified manner different congestion scenarios in the uplink and downlink, before (left side) and after (right side) flow control.
Figure 11:
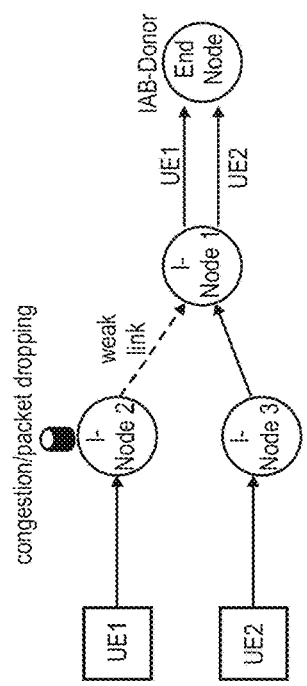

As apparent from the uplink example in FIGS. 10 and 11, congestion and packet dropping is assumed to occur in the intermediate node 2, exemplarily caused by a weak link between the two intermediate nodes 1 and 2 (illustrated by a dashed arrow). In particular, the uplink transmission buffer at the side of intermediate node 2, connected to the intermediate node 1 (exemplarily the Mobile Terminal, MT, side of I-Node 2, as illustrated in FIGS. 8 and 9) may experience a buffer overflow resulting in packet discarding. The flow control may result in that the upstream node UE1 reduces the rate of data transmission to match the transmission capacity available at the weak link, such that the congestion problem is solved at the intermediate node 2 (illustrated by dotted arrows).

Figure 12:
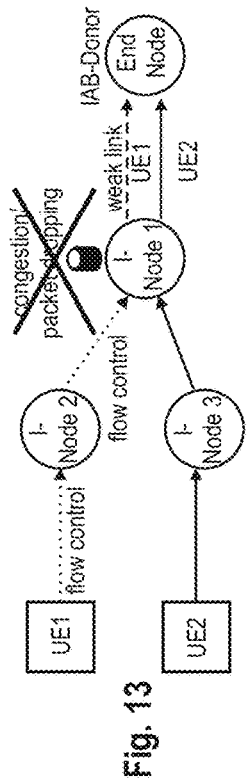
Figure 13:
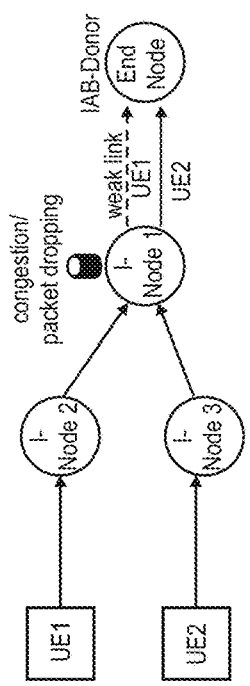

The uplink example in FIGS. 12 and 13 exemplarily assumes a packet congestion of the uplink data traffic at intermediate node 1 due to a weak radio link with the IAB donor. The adaptation of the uplink data transmission at the intermediate node 2 and the UE1, resulting from the flow control, is illustrated using dotted arrows.

Figure 14:
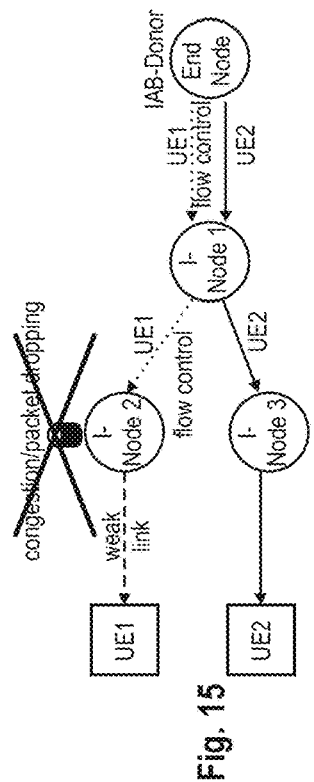
Figure 15:
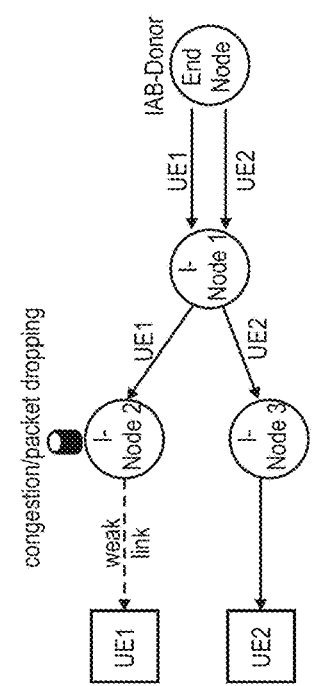

As apparent from the downlink example in FIGS. 14 and 15, congestion and packet dropping is assumed to occur in the intermediate node 2, exemplarily caused by a weak link on the last hop to UE1. In particular, the side of intermediate node 2, connected to the UE (exemplarily the DU side as illustrated in FIGS. 8 and 9) may experience a downlink transmission buffer overflow. Adapting the grant as a flow control mechanism to solve the congestion problem is not possible in this exemplary scenario, because the I-Node 1 does not know the buffer status of the I-Node 2 and I-Node 2 has no control over the situation. In any case, as discussed above for the other two scenarios, flow control may have ideally the result that in order to solve the congestion problem, some or all of the upstream nodes (intermediate node 1 and source node, e.g., IAB donor) decrease the data transmission (illustrated by a dotted arrow). Consequently, less data arrives at the intermediate node 2, and assuming that intermediate node 2 is now able to transmit enough data over the last link to UE1, the congestion problem is solved and no data needs to be dropped for this reason.

Although the above discussed flow control achieves to solve the congestion problems, the inventors have recognized several problems in said connection. For instance, the flow control may be conducted quite late, namely when congestion and/or the packet loss already occurs. There is no flow control before the congestion and packet dropping occurs. Also, the flow control is per-hop flow control, with which the congestion problem may propagate slowly from the congested node to the source node. For instance, if one intermediate node (e.g., I-Node 1 in FIG. 13) first grants less uplink opportunities to the next intermediate node (e.g., I-Node 2 in FIG. 13), the congestion can be alleviated in that node (i.e., I-Node 1). However, this can results in that I-Node 2 is congested. And so on, such that the congestion is slowly propagated from the congested node to the source node. As a result, it takes time to reduce the data from the source node. Further, there is a need for a flow control mechanism in the downlink.

The inventors have recognized the need for defining efficient flow control procedures to facilitate avoiding or alleviating the above-described congestion problems in the downlink and uplink.

In the following, UEs, base stations, and procedures to meet these needs will be described for the new radio access technology envisioned for the 5G mobile communication systems. Different implementations and variants will be explained as well. The following disclosure was facilitated by the discussions and findings as described above and may for example be based at least on part thereof.

In general, it should be however noted that many assumptions have been made herein so as to be able to explain the principles underlying the present disclosure in a clear and understandable manner. These assumptions are however to be understood as merely examples made herein for illustration purposes that should not limit the scope of the disclosure. A skilled person will be aware that the principles of the following disclosure and as laid out in the claims can be applied to different scenarios and in ways that are not explicitly described herein.

Moreover, some of the terms of the procedures, entities, layers, etc., used in the following are closely related to LTE/LTE-A systems or to terminology used in the current 3GPP 5G standardization, even though specific terminology to be used in the context of the new radio access technology for the next 3GPP 5G communication systems is not fully decided yet. Thus, terms could be changed in the future, without affecting the functioning of the embodiments. Consequently, a skilled person is aware that the embodiments and their scope of protection should not be restricted to particular terms exemplarily used herein for lack of newer or finally agreed terminology but should be more broadly understood in terms of functions and concepts that underlie the functioning and principles of the present disclosure.

For instance, a mobile station or mobile node or user terminal or user equipment (UE) is a physical entity (physical node) within a communication network. One node may have several functional entities. A functional entity refers to a software or hardware module that implements and/or offers a predetermined set of functions to other functional entities of the same or another node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "base station" or "radio base station" here refers to a physical entity within a communication network. As with the mobile station, the base station may have several functional entities. A functional entity refers to a software or hardware module that implements and/or offers a predetermined set of functions to other functional entities of the same or another node or the network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently used terminology for 5G NR is gNB.

The expression "reception feedback" used in the claims and in the description should be interpreted broadly to mean any suitable feedback from a receiving side on the successful or not successful reception of data packets previously transmitted by a transmitting side to the receiving side. Exemplary implementations can be based on existing mechanisms such as the RLC status report described above for 5G NR, but may be a variant therefrom or completely different. Further information on how to exemplarily implement the reception feedback is provided when describing the various embodiments.

The term "transmitting window" used in the claims and in the description should be interpreted broadly as a mechanism used for the transmission of data packets (e.g., RLC PDUs). In one example, the transmitting window limits how many data packets can be transmitted, because the transmitting window size determines how many data packets can be transmitted. Furthermore, the transmitting window can exemplarily be implemented as a sliding window such that the transmitting window is slid (i.e., moved) when a data packet was successfully transmitted. One exemplary implementation can be based on existing mechanisms such as the RLC AM window described above for 5G NR. However, other implementations can be used as well. Further information on how to exemplarily implement the transmitting window is provided when describing the various embodiments.

FIG. 16 illustrates a general, simplified and exemplary block diagram of a user equipment (also termed communication device) and a scheduling device (here exemplarily assumed to be located in the base station, e.g., the eLTE eNB (alternatively termed ng-eNB) or the gNB in 5G NR). The UE and eNB/gNB are communicating with each other over a (wireless) physical channel respectively using the transceiver.

The communication device may comprise a transceiver and processing circuitry. The transceiver in turn may comprise and/or function as a receiver and a transmitter. The processing circuitry may be one or more pieces of hardware such as one or more processors or any LSIs. Between the transceiver and the processing circuitry there is an input/output point (or node) over which the processing circuitry, when in operation, can control the transceiver, i.e., control the receiver and/or the transmitter and exchange reception/transmission data. The transceiver, as the transmitter and receiver, may include the RF (radio frequency) front including one or more antennas, amplifiers, RF modulators/demodulators and the like. The processing circuitry may implement control tasks such as controlling the transceiver to transmit user data and control data provided by the processing circuitry and/or receive user data and control data, which is further processed by the processing circuitry. The processing circuitry may also be responsible for performing other processes such as determining, deciding, calculating, measuring, etc. The transmitter may be responsible for performing the process of transmitting and other processes related thereto. The receiver may be responsible for performing the process of receiving and other processes related thereto, such as monitoring a channel.

In the present case as will become apparent from the below disclosure of the different embodiments and variants thereof, the processor can thus be exemplarily configured to at least partly perform the step of determining the transmitting window size, e.g., increasing and decreasing it, when appropriate. The processing circuitry can also at least partly perform the step of operating a timer, e.g., starting, monitoring, stopping same, and determining its expiry. Another task that can be performed at least partly by the processing circuitry is evaluating a feedback signal, such as ACK, NACKs, to determine whether a data packet was successfully received at the receiving side or not.

The transmitter can be configured to be able to at least partly perform the step of transmitting data packets.

The receiver can in turn be configured to be able to at least partly perform the step of receiving reception feedback from a receiving side regarding previously transmitted data packets.

The solutions offered in the following mainly apply to the new 5G NR standardization (standalone and non-standalone), particularly to the IAB extension but may also apply to other systems such as the relay in LTE. Moreover, in the following the solutions are mainly presented in the context of IAB scenarios, with multi-hop data traffic routes involving a UE as one end node, one or more IAB intermediate nodes in between and an IAB donor as the other end node. This is however mainly to facilitate illustration and explanation of the solutions. Therefore, the solutions as explained in the following do not need to be used in IAB scenarios only, but can also be used in other scenarios with multi-hop data traffic routes such as the LTE relay.

Still moreover, although it is not the main usage scenario the following solutions can also be applied to one-hop scenarios, e.g., where the UE is directly connected to a base station (e.g., gNB). A simplified IAB scenario exemplarily assumed in the following is illustrated in FIG. 17, comprising two data traffic routes, one being UE1—Intermediate Node 2 (I-Node 2)—Intermediate Node 1 (I-Node 1)—End Node (e.g., IAB Donor) and the other one being UE2—Intermediate Node 3 (I-Node 3)—Intermediate Node 1 (I-Node 1)—End Node (e.g., IAB Donor). An uplink transmission scenario is further exemplarily assumed, according to which the data is transmitted by the UEs towards the end node thereby traversing the respective wireless access and backhaul links.

However, the discussed solutions can also be applied for downlink data traffic routes, with the respective change of sides, e.g., where the UE is the data receiving side instead of the data transmitting side. Correspondingly, in End-to-End ARQ solutions the UE is thus the receiving RLC ARQ entity and the IAB donor is the transmitting RLC ARQ entity.

Moreover, the solutions can be applied to an end-to-end ARQ architecture as well as to a hop-by-hop ARQ architecture as will be explained in the following.

One exemplary solution will be explained with reference to FIG. 18, which illustrates a processing sequence performed at the UE side (e.g., UE1 and/or UE2 in FIG. 17). It should be noted however that the UE is taken here as the transmitting side of the data traffic route. The same behavior can thus be used for a transmitting side that is not the UE, e.g., the serving base station, the IAB donor. In this case, the UE would be the receiving side.

For instance, depending on the implemented ARQ architecture option (be it E2E or HBH ARQ), the reception feedback can be transmitted by an intermediate node (HBH case) or the end node (E2E case) of the data traffic route. To begin with, this solution, even though applicable to both E2E and HBH ARQ options, will be explained primarily with regard to an E2E ARQ option.

In brief, the following solutions introduce a dynamic transmitting window size mechanism that allows adapting the transmitting window size to the data traffic conditions on the data traffic route, based on the reception feedback determined for previously transmitted data packets.

As apparent from FIG. 18, the exemplary and simplified UE procedure starts with the user equipment transmitting data packets towards the end node via the IAB wireless backhaul. The transmission is performed by the UE based on a transmitting window. Subsequently, the UE receives a reception feedback regarding those previously transmitted data packets, e.g., in the form of positive and/or negative acknowledgements.

Assuming the E2E ARQ solution in this example scenario, it is the destination node of the data traffic route, i.e., the IAB donor, that transmits the reception feedback to the source node of the data traffic route, i.e., the UE(s). The data packets were forwarded by the intermediate IAB nodes (I-Nodes 1-3) up to the IAB donor, which is the entity determining and transmitting the reception feedback for those data packets.

The UE, after receiving the reception feedback, can use this reception feedback to determine whether the size of the transmitting window (being used to transmit data packets) needs to be changed, e.g., whether it is still appropriate for the data traffic route.

The UE can decide to change the size of the transmitting window and proceeds to transmit the data packets on the basis of the transmitting window with the adapted size. On the other hand, the UE can decide to maintain the size of the transmitting window unchanged and proceeds to transmit data packets on the basis of the transmitting window with the unchanged size.

In this solution the reception feedback, when analyzed by the transmitting side, can be used as an indicator about a possible or imminent congestion in the downstream, or more broadly about the data throughput that is available in the downstream. For instance, the UE can determine from the latency of the feedback (e.g., positive or negative ACK) the queuing delay and throughput limitation. Put differently, the UE analyzes the reception status of previously transmitted data packets (e.g., received from the receiving side) so as to identify a situation where it is advantageous to adapt the transmitting window size (e.g., a congestion situation, a low data throughput situation, etc.).

For instance, a congestion or an imminent congestion in a downstream node, such as the intermediate node I-Node 1, can be characterized e.g., by a lot of negatively acknowledged data packets that are caused e.g., by a weak link between the intermediate node and the next downstream node (e.g., in FIG. 17, the wireless backhaul link between I-Node 1 and the End node, IAB donor). Data packets may be dropped at the intermediate node I-Node 1, causing negative acknowledgments to be transmitted for those data packets from the receiving side, e.g., the IAB donor, to the transmitting side, i.e., UE. In order to facilitate avoiding or solving the congestion, the UE on that basis may decide to adapt the transmitting window size as part of a flow control mechanism.

On the other hand, a lot of positively acknowledged data packets hint at a strong data traffic route (strong meaning e.g., good radio links), possibly allowing more data packets to be transmitted.

The UE behavior can flexibly adapt the data transmission to changing conditions over the wireless backhaul and access links of the multi-hop data traffic route. For instance, the UE can decrease the transmitting window size such that the rate of data packet transmission is decreased. This allows the data traffic to adapt to the reduced transmission capabilities experienced by the (congested) intermediate node on the radio link (assumed to be weak). The intermediate node may thus not get congested in the first place, or if already congested, may facilitate that the intermediate node reduces or solves the congestion.

On the other hand, in order to increase the data throughput, the UE can increase the transmitting window size. For instance, this may be advantageous in case the UE has been operating with a reduced transmitting window size (e.g., after having decreased the transmitting window and thus the data throughput before) so as to restore the previous data throughput after a congestion is solved (e.g., there is no more weak link, because of less interference). For instance, instead of receiving a lot of negative acknowledgments, the UE after the flow control receives a lot of positive acknowledgments and thus may conclude that reducing the transmitting window size is no longer necessary (e.g., congestion is solved). Increasing the transmitting window size to increase the data throughput may however be also advantageous without the prior reducing of the transmitting window size, for instance in case it is possible to further increase the data throughput over the data traffic route (e.g., in case of a fluent data traffic route).

Overall, the data throughput can be reduced by reducing the transmitting window size (e.g., weak radio link, congestion) (optionally not further down than to a minimum), and the data throughput can be increased by increasing the transmitting window size (e.g., good radio link, no congestion) (optionally not further up than to a maximum).

Reducing and increasing the transmitting window size can be performed step wise in line with different steps and step sizes, e.g., increasing/decreasing every time by respectively 5 PDUs. As mentioned above, this step-by-step adaptation of the transmitting window size can be limited by a maximum (e.g., 5000, but any other suitable number would equally be possible) and minimum (e.g., 1 PDU, but any other suitable number would equally be possible) transmitting window size Different criteria and conditions can be defined on how to identify the need to increase or decrease the transmitting window size, e.g., a congestion and/or throttled data packet throughput, based on at least the reception feedback. In further exemplary variants, other information may be used, in addition to the reception feedback, for said determination so as to facilitate distinguishing other scenarios from the data congestion. For instance, the reception feedback for previously transmitted data packets may not only be received from the receiving side, but could also be autonomously determined by the UE, e.g., based on a timer, as will be explained in more detail later. As another example, the UE may also obtain other information (e.g., via the adaption layer) on for example channel quality report, congestion report from downstream nodes, which the UE can use to perform the determination.

In one variant, one condition is based on the number of continuous positive or negative acknowledgments determined for the data packets previously transmitted by the UE (e.g., continuous in the sense that the acknowledgments refer to continuous data packets, i.e., with continuous sequence numbers). For instance, the condition to be checked is whether the number of continuous negative acknowledgments is higher than a predetermined threshold, and if it is higher, the UE may decrease the transmitting window size. Conversely, if it is not higher, then the UE may not decrease the transmitting window size but maintain the transmitting window size unchanged and may continue the transmission of data packets using the transmitting window.

Correspondingly, the UE may further perform a similar check for the positive acknowledgments such that the UE determines whether the number of continuous positive acknowledgment is higher than a predetermined threshold (the same or different from the threshold used to compare against the continuous negative acknowledgments), and if it is higher, the UE may increase the transmitting window size. Conversely, if it is not higher, then the UE may not increase the transmitting window size but maintain the transmitting window size unchanged and it may continue the transmission of data packets using the transmitting window.

A further alternative or additional condition to be checked by the UE may refer to the number of positive and/or negative acknowledgments determined within a predetermined period of time. Specifically, the UE monitors positive and negative acknowledgments received within a period of time (in this case these acknowledgments may refer or not to continuous data packets). Similar to what was just explained for the previous condition, the thus monitored number of positive acknowledgements can be compared against a threshold to determine whether to increase the transmitting window size; and vice versa the thus monitored number of negative acknowledgements can be compared by the UE against the same or another threshold to determine whether to decrease the transmitting window size. For example, the UE continuously monitors during a time period of x seconds (e.g., where x is 3 seconds or more) whether more than y positive/negative acknowledgements (e.g., where y also depends on the number of transmitted packets and the length of the monitoring period x is) are received.

Still a further alternative or additional condition to be checked by the UE may be to determine a relationship of positive and/or negative acknowledgments when compared to the total number of transmitted data packets. For example, the UE keeps track of the total number of data packets and monitors the positive and/or the negative acknowledgements determined with respect to these transmitted data packets. For instance, the relationship (e.g., expressed as a percentage, such as NACK/data packets and ACK/data packets) can be determined by the UE and compared against a respective threshold. If the percentage is above the threshold, the UE determines to respectively reduce (if NACK percentage above NACK threshold) or increase (if ACK percentage above ACK threshold) the transmitting window size.

The above discussed conditions are only to be understood as examples. A skilled person can equally define variants of these conditions or entirely different conditions.

Furthermore, the above description separately described these conditions used for determining whether or not to change the size of the transmitting window. However, other variants of the solutions can rely on that one or more of these conditions have to be fulfilled in order for the UE to determine that the transmitting window size has to be changed. This may increase the reliability of identifying a situation such as a congestion or imminent congestion.

These conditions and/or the corresponding parameters (e.g., thresholds) to perform the step of determining whether to change the transmitting window size or not may be predetermined at the UE, e.g., being configured by the network side (e.g., the IAB donor; e.g., using higher-layer configuration messages such as part of the RRC layer) or may be hard coded into the UE (e.g., via the SIM card or programmed in line with 3GPP specifications).

The above solutions have been described by way of step-wise increasing and decreasing the transmitting window size as appropriately determined based on reception feedback determined for previously transmitted data packets. However, further to the step-wise increasing and decreasing the transmitting window size, it is equally possible to implement the solutions using at least two different transmitting window sizes which can be selected by the UE based on the reception feedback obtained for previously transmitted data packets.

According to one exemplary implementation, only two transmitting window sizes can be defined, between which the UE toggles depending on the reception feedback. For instance, an initial transmitting window size can be used by the UE to start the data packet transmission. A reduced transmitting window size (e.g., halve the initial transmitting window size) can be used by the UE for further data packet transmission after determining to decrease the transmitting window size (e.g., in case too many negative acknowledgements are received). In turn, the UE may eventually determine to again increase the transmitting window size to the one initially used, and so on.

Conversely, the initial transmitting window size can be the lower value, such that the UE starts with a lower data throughput, which can be increased by increasing the transmitting window size upon determining that the condition for an increase of the transmitting window size occurs.

However, while only two different sizes of the transmitting window are described above, other exemplary implementations may use more than two suitable transmitting window sizes from which the UE can choose. Having more transmitting window sizes could optionally also benefit from implementing more than one threshold for determining how much to decrease or increase the transmitting window size based on the determined reception feedback. This might facilitate implementing a more precise, finer and still quick flow control mechanism.

FIG. 19 illustrates a simplified and exemplary UE structure according to the above described solution. The various structural elements of the UE illustrated in FIG. 19 can be interconnected between one another e.g., with corresponding input/output nodes (not shown) e.g., in order to exchange control and user data and other signals. Although not shown for illustration purposes, the UE may include further structural elements.

As apparent therefrom, the UE includes a data packet transmitter which transmits data packets based on the transmitting window (e.g., before and after updating the transmitting window size). The UE further includes a reception feedback receiver for receiving the reception feedback regarding the at least one transmitted data packets. The UE also comprises circuitry for determining the transmitting window size (transmitting window size determiner circuitry in FIG. 19), based on the reception feedback received by the reception feedback receiver.

Figure 20:
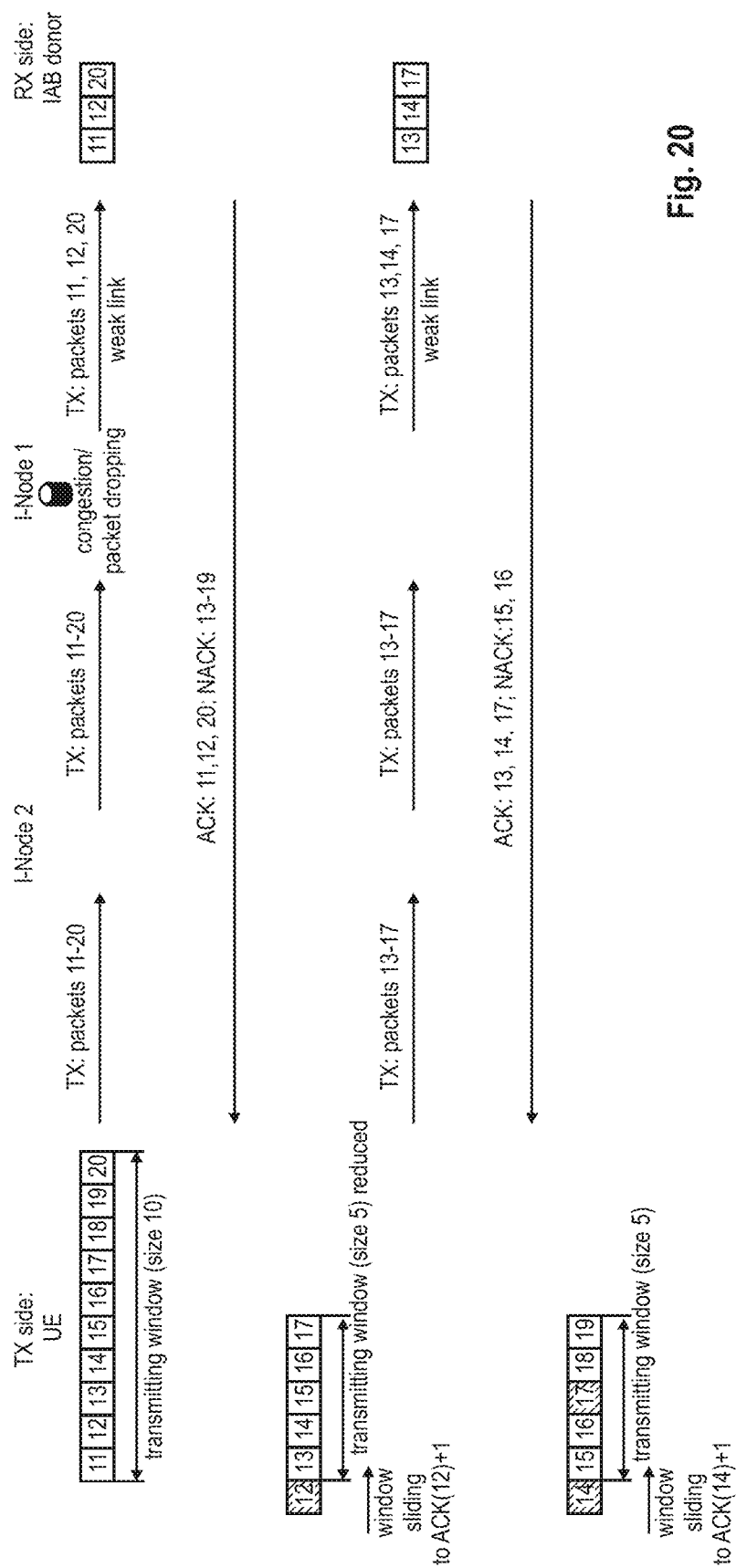
FIG. 20 illustrates the data packet exchange between the transmitting side (here exemplary the UE) and the receiving side (here exemplary the IAB donor)

FIG. 20 illustrates one exemplary data packet exchange according to one of the exemplary solutions described above. It is exemplarily assumed that the UE, as the transmitting side and source node, uses a transmitting window with the size of 10 PDUs when transmitting data packets towards an IAB donor (as the destination node and receiving side). The packets are to be forwarded by the intermediate nodes I-Node 2 and I-Node 1. It is also exemplarily assumed that the intermediate node I-Node 1 experiences congestion (maybe due to a weak wireless link to the IAB Donor), which results in that only some of the incoming data packets can be transmitted (e.g., packets 11, 12 and 20). It is assumed that the data packets 11, 12 and 20 are actually successfully received at the IAB donor; further assuming that the data packet with SN=20 also includes a RLC Status polling request. Assuming that a corresponding feedback is triggered at the receiving side by this polling request, the IAB donor transmits a reception feedback to the transmitting side (UE), indicating that the data packets with the sequence numbers 11, 12, and 20 (see ACK in figure) have been successfully received, whereas data packets with the sequence numbers 13-19 are negatively acknowledged (see NACK in figure).

The UE can determine from the number of NACKs that a congestion is occurring within the data traffic route and reduces the transmitting window size to halve (e.g., to 5 in this case). Furthermore, the transmitting window is slid so the lower edge is at SN=13 (i.e., 12+1) and the upper edge is SN=17. Correspondingly, data packets with sequence numbers 13-17 are transmitted from the UE side while it is assumed that the data traffic route is able to transmit 13-17 to the IAB donor. Again, it is assumed that the a corresponding reception feedback is triggered on the receiving side (e.g., polling bit in packet 17) and informs the UE about the positive acknowledgment of data packets with sequence numbers 13, 14 and 17 and negative acknowledgments of data packets with sequence numbers 15 and 16

The data throughput is thus adapted to the available throughput capability of the last intermediate node (with the congestion).

As explained above for the various solutions, the transmitting window size is dynamic and can be adapted based on reception feedback obtained by the transmitting side for previously transmitted data. While the transmitting side (of the ARM RLC entity) adapts the transmitting window size, the receiving side does not have to change its own receiving window size in the same manner. The receiving side can maintain the same receiving window size as before, e.g., the size with which it was initialized. For instance, the receiving window is initialized with the maximum size possible and is not changed even if the transmitting side (e.g., the UE) decreases its transmitting window size. In such a solution would not even be aware that the transmitting side reduced the transmitting window size.

In other exemplary implementations, the transmitting window size and the receiving window size can be synchronized, such that in case the transmitting window size and the receiving window size are increased and decreased to the same extent and (almost) at the same time. The synchronizing of the sizes of the transmitting and receiving windows is able to prevent the receiving side from keeping and/or discarding of PDUs incorrectly, which might result in different window sliding behaviors.

In one exemplary implementation, the receiving side can make the same determination as the transmitting side, namely whether to increase or decrease or maintain (i.e., unchanged) the transmitting window size based on the reception feedback. In said case, the transmitting and receiving sides may advantageously have the same basis of the determination (i.e., the reception feedback).

A further solution to synchronize the transmitting window size and the receiving window size is to use explicit signaling, e.g., information on the new transmitting window size is transmitted to the receiving side, e.g., as part of the data packet (e.g., in the same or similar manner as the Status report poll bit). With this information, the receiving side (e.g., the IAB donor in the uplink scenario) can adapt the size of the receiving window in the same manner.

Moreover, the receiving side may be further changed to prioritize the transmission of the reception feedback (e.g., prioritize reception feedback over other transmissions, such as user data), if the receiving side knows the acknowledgement timer is going to expire soon. For instance, the receiving side may be further changed to down-prioritize the transmission of the reception feedback, if the receiving side knows the acknowledgement timer has already expired. The transmitted data packet may e.g., include a time stamp, as when it was transmitted from the transmitting side, such that the receiving side can predict when the corresponding acknowledgement timer at the transmitting side expires.

In the above description, the solutions using the adaptive transmitting window are primarily described from the perspective of the transmitting side, e.g., the UE in the uplink scenario assumed in FIG. 17.

Figure 21:
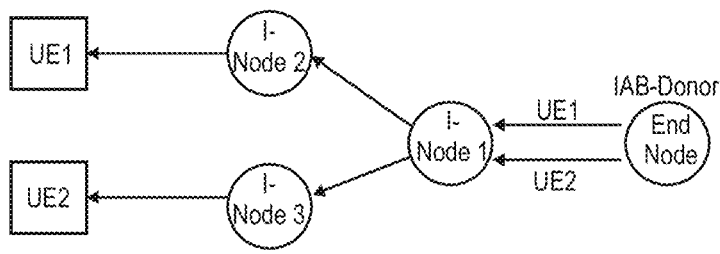
FIG. 21 illustrates an exemplary downlink data traffic route scenario.

FIG. 21 illustrates an exemplary IAB scenario of a downlink data traffic route, in a similar manner as FIG. 17. In this exemplary scenario of FIG. 21, the UE is the entity receiving data packets. It is further exemplary assumed that E2E ARQ is implemented, according to which the UE comprises the receiving RLC ARQ entity, and the IAB donor comprises the transmitting RLC ARQ entity. The UE reports the reception feedback to the transmitting side (e.g., in this scenario the IAB donor). On the other hand, the transmitting side then performs the adaption of the transmitting window size, based on the reception feedback for previously transmitted data packets. The various solutions described for being performed by the UE (as the transmitting side in the uplink scenario) and the IAB donor (as the receiving side in the uplink scenario) are equally applicable to the behavior of the IAB-donor (as the transmitting side in the downlink scenario) and the UE (as the receiving side in the downlink scenario).

In brief and as an overview, the IAB donor transmits the data packets to the UE based on a transmitting window, whereas the UE returns the reception feedback to the IAB donor for the received data packets (be it a positive or negative acknowledgment depending on whether the data packet could be successfully decoded or not). Based on that reception feedback (possibly with further information) the IAB donor determines whether to change its transmitting window size, for instance by either increasing, decreasing the transmitting window size or maintaining it unchanged. The IAB donor continues transmitting data packets in the downlink based on the transmitting window with a size that is either increased, decreased or maintained the same as before.

As will be explained in the following, the solutions according to FIG. 18 described above were mainly described as part of an E2E ARQ architecture but can also be applied to an HBH ARQ architecture, where ARQ is performed at every hop. Thus, the solution can be implemented between any two nodes of the data traffic route, such as between the UE and the next intermediate node, between two intermediate nodes, and between an intermediate node and an IAB donor. These can be implemented at the respectively applicable nodes, such as the UE, the intermediate nodes and the IAB donor.

More specifically, the first intermediate node in the data traffic route after the UE (e.g., the I-Node 2 for UE1, or I-Node 3 for UE2 in FIG. 17) receives the previously transmitted data packets and returns a feedback on the reception of said data packets to the UE1, when supporting HBH ARQ. As explained in great detail above with respect to the End-to-End solutions, the UE can thus adapt the transmitting window size based on the received reception feedback. In order to avoid repetitions, the reader is kindly referred to the above sections describing the solutions for E2E in said respect.

The solutions explained above are also applicable to one-hop scenarios, where the two end nodes would be the UE and the gNB as the serving base station. For such a one-hop scenario, distinguishing between an E2E ARQ and HBH ARQ solution is not necessary, because there is only one hop. Or, put differently, ARQ on one hop is basically both E2E and HBH at the same time. Corresponding, the intended recipient of the data packets would be the serving base station (e.g., gNB) of the UE, and the reception feedback would be transmitted by the serving base station (e.g., gNB) to the UE.

In other variants of solutions, the above described improved flow control mechanisms based on the adaptive transmitting window size can be selectively activated for specific occasions or scenarios. As explained above, while the solutions can apply to multi-hop scenarios (such as the IAB) or also single-hop scenarios, congestion problems typically occur in multi-hop solutions. Thus, the network side could decide to only activate such a flow control mechanism when the UE is in a multi-hop scenario.

According to one solution, the network side can decide whether to use such improved flow control mechanisms and accordingly configures the user equipment in said respect. For instance, the serving base station (e.g., the IAB donor) can use RRC signaling to active the functionality, e.g., the RRC Reconfiguration message, or the RRC setup and RRC Reestablishment messages.

It should be noted that, depending on the actual implementation, whether or not data is transmitted over a multi-hop scenario may be transparent to the UE, i.e., the UE is not aware of any intermediate nodes and assumes that it is directly connected to the serving base station (IAB donor). Correspondingly, in such scenarios the UE may not autonomously activate such functionality, because it is simply unaware of the particular usage scenario.

The improved flow control mechanisms using the adaptive transmitting window size has been generally explained above. In particular implementations, these mechanisms and solutions can be implemented into the existing and future 5G NR framework as well as LTE framework. For instance, the solutions can be implemented in combination with the RLC layer as currently defined for 5G NR. As explained before, the RLC layer provides ARQ functionality for its AM data transfer, comprising retransmissions to be performed and the reception feedback to be implemented as a RLC Status Report (see FIG. 5).

When implementing the solutions into the RLC AM protocol functionality, the RLC AM data transfer uses a transmitting window with a dynamic size (AM_Window_Size), instead of a fixed one.

One very specific exemplary implementation will be explained in the following. A maximum window size (Max_AM_Window_Size) as well as a different initial window size (Init_AM_Window_size) (see, e.g., section 9.2 of 3GPP TS 38.322 version 15.2.0):

Max_AM_Window_Size:
This constant is used by both the transmitting side and the receiving side of each AM RLC entity. Max_AM_Window_Size=2048 when a 12 bit SN is used, Max_AM_Window_Size=131072 when an 18 bit SN is used.

Init AM_Window_Size:
Init AM_Window_Size equals to half of the Max_AM_Window_Size Moreover, the AM data transfer definition on the transmitting side can be amended with the following (see, e.g., section 5.2.3.1.1 of 3GPP TS 38.322 version 15.2.0):

Initially, the AM_Window_Size is equal to Init AM_Window_Size, and is updated upon receiving the STATUS PDU according to 5.3.2.

When receiving a positive acknowledgement for an RLC SDU with SN=x, the transmitting side of an AM RLC entity shall:
if continuous $N_{pos}$ positive acknowledgements have been received and if AM_Window_Size<Max_AM_Window_Size
AM_Window_Size=AM_Window_Size*2

Still further, the ARQ procedure definition on the transmitting side can be amended with the following (see, e.g., section 5.3.2 of 3GPP TS 38.322 version 15.2.0):

When receiving a negative acknowledgement for an RLC SDU or an RLC SDU segment by a STATUS PDU from its peer AM RLC entity, the transmitting side of the AM RLC entity shall:
if continuous $N_{neg}$ negative acknowledgements have been received
AM_Window_Size=AM_Window_Size/2

The AM data transfer definition on the receiving side can be amended such it is uses the Max_AM_Window_Size as its receiving window size.

Moreover, the transmission of the reception feedback request from the transmitting side to the receiving can be performed based on a polling bit, triggered according to one of the triggered conditions defined for the RLC layer. As explained before, polling the RLC status report from the receiving side may involve transmitting a polling bit in the PDU from the transmitting side to the receiving side. According to further variants of the above solutions, some of the triggered conditions for polling the status report from the receiving side can be adapted to the adapted transmitting window size. This may facilitate that the transmitting ARQ side is able to obtain the reception status of previously transmitted PDUs in a reasonable time.

For instance, those triggers that are based on the amount of data transmitted depend on adapted transmitting window size, considering that the transmitting window size strongly influences the amount of data that can be transmitted. Consequently, the user equipment may take the current transmitting window size into account when determining whether those data amounts trigger conditions are fulfilled or not.

For instance, the UE determines whether at least a number of data packets or bytes have been transmitted after the last RLC status report has been polled, and scales the number of data packets and bytes based on the transmitting window size (or sizes) that was used to transmit those data packets.

One particular implementation uses a scaling factor to scale the trigger conditions up or down as needed. Specifically, the scaling factor may reflect the relationship e.g., between the maximum transmitting window size and the used transmitting window size. For instance, if a half the transmitting window size was used, then the condition for triggering the RLC status report can be half as well (e.g., half the data PDUs and/or half the bytes), and vice versa.

Similarly, a further trigger condition for polling the RLC status report is the expiry of the Poll retransmit time that controls the time after the last polling was transmitted. By also scaling this timer in accordance with the transmitting window size, it is possible to send the poll more frequently when the transmitting window size is small. This may have the advantage of facilitating to avoid window stalling because acknowledgments within the RLC status report are received earlier and correspondingly the transmitting window can be slid earlier.

The adaptation of the trigger conditions has been generally explained above. In particular implementations, it can be implemented into the existing and future 5G NR framework as well as LTE framework. For instance, the solutions can be implemented in combination with the RLC layer as currently defined for 5G NR.

For instance, a new scaling factor definition can be added to the existing definitions (see section 7.4 of 3GPP TS 38.322 version 15.2.0):

d) pollIABScale

This parameter is used by the transmitting side of each AM RLC entity to scale up or down the parameter pollPDU and pollByte as well as the t-PollRetransmit.

Correspondingly, by adapting some or all of the trigger conditions to the adapted transmitting window size, the polling (requesting) of the reception feedback is more appropriate and can be shifted either back or forth in time as needed.

According to a further set of variations, the transmitting node (e.g., the UE) can control a timer (e.g., called in the following acknowledgement timer) for previously transmitted data packets. For instance, the UE could control one timer per transmitted data packet so as to control the positive or negative acknowledgement for data packets.

In one exemplary implementation the transmitting node (e.g., the UE) can start one acknowledgment timer upon transmitting a data packet. The timer is stopped when receiving feedback on the reception status for said data packet (i.e., the data packet for which the timer was started). The feedback can be a positive acknowledgment or a negative acknowledgment, e.g., received within an RLC status report.

In case no feedback is received for a data packet, the corresponding acknowledgment timer eventually expires, in which case the transmitting side determines that the respective data packet was not correctly received by the receiving side. Correspondingly, the transmitting side determines a NACK for that data packet.

According to one exemplary variant, the NACK can be used by the transmitting side in the same manner as a NACK received from the receiving side (e.g., within a RLC status report). NACKs determined from such acknowledgement timers as well as NACKs received from the receiving side can be used by the transmitting side to determine whether to change the transmitting window size or not. In particular, some of the conditions described above rely on the number of NACKs obtained for previously transmitted data packets.

The acknowledgement timer and its time value can be preconfigured, for instance, configured by the network side, e.g., by transmitting a suitable configuration message to the transmitting side, e.g., the UE. In one example, the acknowledgment timer and its value can be configured through one or more of the RRC Reconfiguration, RRC Setup, or RRC Reestablishment messages.

On the other hand, in addition or alternatively the acknowledgment timer and its time value can be predetermined as being part of the SIM or defined as part of 3GPP specifications.

One benefit facilitated by being configured from the network side is that the value of the timer can be adapted to the number of hops between the transmitting side (e.g., the UE) and the receiving side (e.g., the IAB donor). Particularly, the longer the route (e.g., more hops) the longer the value of the acknowledgement timer can be set, and conversely, the shorter the route (e.g., less hops), the shorter the acknowledgement timer can be set.

One further benefit can be that the value of the acknowledgement timer can adapted to the service type that is associated to the data packets. The service type can be e.g., video conference service or the best effort service (email, FTP) and impose certain requirements as to bandwidth and latency. For instance, the higher priority of the service could mean that more bandwidth is needed, in which case the higher the priority the longer the timer value can be set.

Optionally, the NACK obtained by the transmitting side when the acknowledgement timer expires can also be used to trigger a retransmission in the transmitting side for said lost data packet.

The new acknowledgment timer mechanism has been generally explained above. In particular implementations, it can be implemented into the existing and future 5G NR framework as well as LTE framework. For instance, the solutions can be implemented in combination with the RLC layer as currently defined for 5G NR.

For instance, a new timer definition can be added to the existing definitions (see section 7.3 of 3GPP TS 38.322 version 15.2.0):

d) t-IAB_NACK

This timer is used by the transmitting side of an AM RLC entity in order to determine a PDU as being NACKed upon the expiry of the timer.

Figure 22:
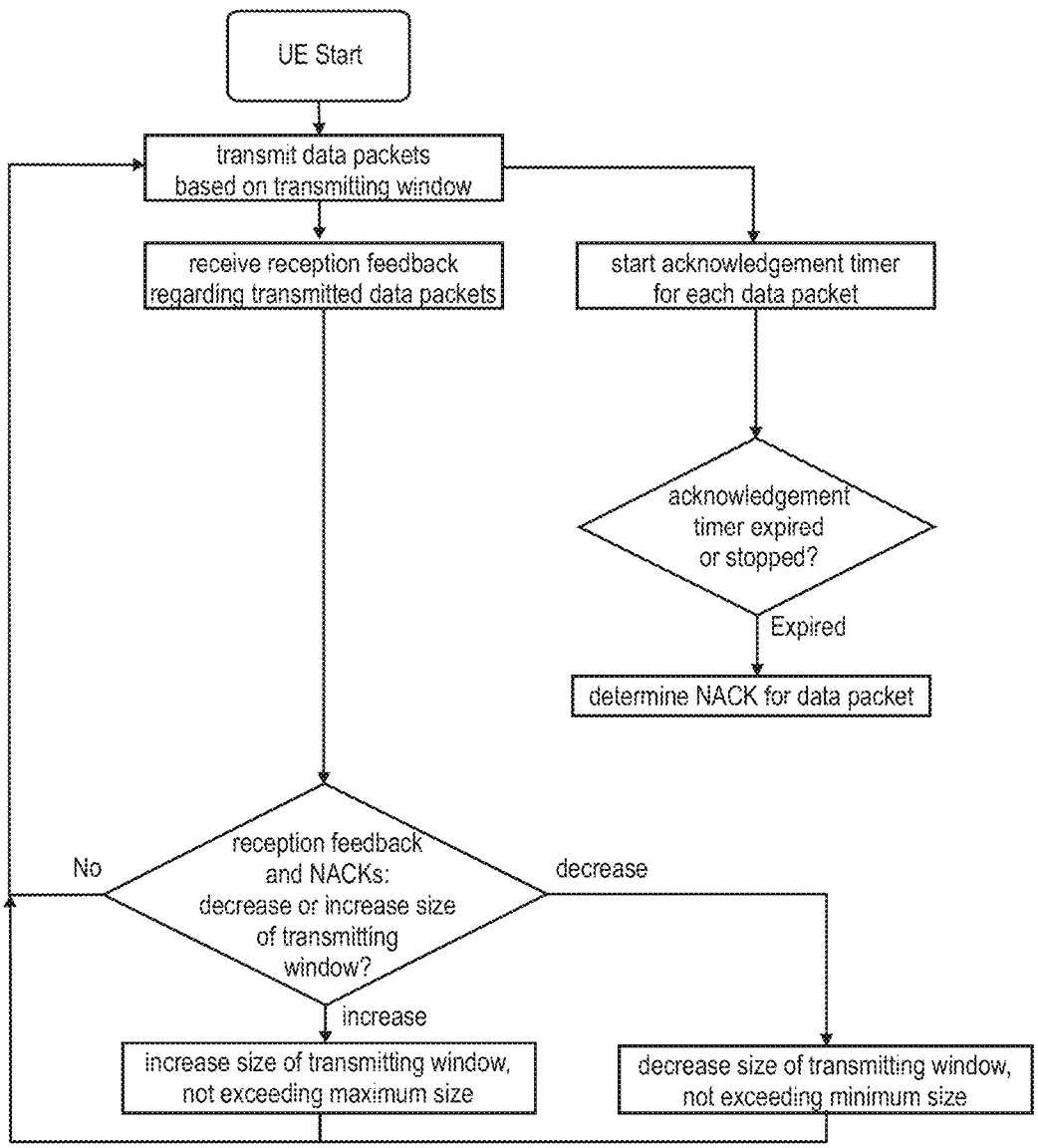
FIG. 22 is a flow diagram for the behavior of a transmitting side, here exemplary the UE, according to another exemplary implementation of an embodiment.

An exemplary solution, using the adaptive transmitting window as well as the acknowledgement timer, is illustrated in FIG. 22, which depicts a flow diagram for processes performed at the UE (as the transmitting side). Compared to the flow diagram of FIG. 18, FIG. 22 is more specific in that it refers to an implementation that increases and decreases the transmitting window size, in that it operates an acknowledgement timer for each data packet and is used to generate additional negative acknowledgements for data packets after its respective expiry. The additional negative acknowledgments can then be used to make the determination of increasing, decreasing the transmitting window size or maintaining the transmitting window size unchanged.

As apparent from FIG. 22, the UE thus may starts the acknowledgement timer for each transmitted data packet and may control the timer as to whether it is stopped (e.g., by received reception feedback, such as ACK or NACK) or expires. Upon expiry of an acknowledgement timer, the UE determines that the corresponding data packet (for which the timer was started) could not be transmitted successfully and considers the data packet to be negatively acknowledged (NACKed).

This timer-NACK can then be used, together with the reception feedback received from the receiving side, to adapt the transmitting window. In said respect, any of the above-discussed conditions can be checked against the reception feedback in order to determine whether and how to adapt the transmitting window size. Depending on the outcome, the transmitting window size is increased, decreased or not changed. In any case, the procedure of the UE continues with transmitting data packets using the transmitting window (be it with an increased, decreased or the same size as before).

A further solution will be explained in the following. One problem of HBH ARQ (e.g., in the multi-hop scenarios such as IAB), identified by the inventors, is that the ARQ operation in one hop is isolated from the ARQ operation in another hop. For instance, when assuming a congestion in the downlink at IAB node 2 of FIG. 8, the DU-side buffer starts overflowing as its receives many NACKs from the UE and still receives incoming PDUs from the MT side of IAB node 2. The ARQ operation between the IAB node 2 and IAB node 1 works normally because IAB Node 1 only receives ACKs from the IAB Node 2 MT.

The following solutions can be used between the two nodes of a hop, respectively being the transmitting node and the receiving node of the hop, depending on whether the node is transmitting the data packets or receiving the data packets. For instance, in the downlink case, the UE can be the receiving node and the first intermediate node can be transmitting node; in the uplink case, the UE would be the transmitting node and the first intermediate node would be the receiving node. This logic would similarly apply in other hops, e.g., a hop involving two intermediate nodes, or a hop involving one intermediate node and the IAB node. To facilitate the discussion and description of the following situation, an exemplary scenario is assumed where the congestion occurs in the uplink at the first intermediate node after the UE (I-Node 2 in FIG. 8). HBH ARQ is performed between the I-Node 2 and I-Node 1 and HBH ARQ is performed between UE and I-Node 2. In such a scenario, I-Node 2 will provide congestion information to the UE.

However, although the solutions will be described in the context of such an uplink scenario with respect to the first hop between the UE and the I-Node 2, it will be apparent to the reader that the solutions can equally be applied on other hops and in downlink scenarios.

One exemplary solution is based on internal signaling within the DU side and MT side of an intermediate node, such as the I-Node 2 of the assumed scenario. As exemplified above, in case of a congestion on one side of the intermediate node, the other side of the intermediate node continues to acknowledge incoming data packets. Consequently, by internally indicating to the other side that a congestion is occurring or will occur, the other side of the intermediate node can stop sending the ARQ feedback for further incoming data packets (e.g., from UE). For instance, the stopping of acknowledging incoming data packets can be limited to an amount of time, such as indicated internally by the other side or may be preconfigured. Correspondingly, the upstream node (e.g., the UE in the assumed scenario, or in other scenarios another intermediate node or the IAB-donor) would reduce its transmission of further data packets, because it cannot slide its transmitting window in the absence of positive acknowledgements from the receiving side of the hop. Thereby, this implicit indication can solve or avoid congestion problems.

According to an alternative or additional solution, congestion information is explicitly transmitted between two nodes of a hop, when performing a Hop-By-Hop ARQ, specifically from the intermediate node experiencing the congestion (e.g., the intermediate node) to its upstream node transmitting the data (e.g., the UE in the assumed scenario, or in another scenario another intermediate node or the IAB donor).

This congestion information can e.g., be received as part of the reception feedback (e.g., RLC ARQ information). The congestion information can be as short as one bit, in which case it will distinguish that the downstream node (e.g., I-Node 2 in the assumed scenario) is congested or not. Alternatively, the congestion information can be several bits long, in which case it could provide more detailed information about the congestion. For instance, the congestion information could distinguish between different reasons for the congestion, such as a congestion due to a weak radio link to the next downstream node, or a congestion due to very limited grants provided by the downstream node. The congestion information may also indicate how severe the congestion is, which would allow the node receiving the congestion information (e.g., the UE in the assumed scenario) to react in an appropriate manner by e.g., how much the data rate is reduced. The transmitting side (e.g., UE in the assumed scenario) at least for a period of time reduces the rate of transmitting data to the receiving side of the hop.

In further variants of the solution, the transmitting side of the hop (e.g., the UE in the assumed scenario) analyzes the congestion information based on the reception feedback (e.g., ACK; NACK) received from the receiving side of the hop. For instance, the distribution of the positive and/or the negative acknowledgements allows the transmitting side (e.g., the UE) to distinguish between a packet loss caused by the congestion and a packet loss caused by radio interference. For instance, negative acknowledgements that are to some extent evenly distributed in the transmitted data packets might indicate packet loss are caused by the congestion. On the other hand, a set of continuous NACKs (i.e., referring to continuous sequence numbers) might indicate packet loss is caused by the radio interference.

Depending on the situation, the transmitting side of the hop (e.g., the UE) might react differently to the received congestion information. For instance, if the packet loss are mainly caused by the congestion of the downstream node, the transmitting side (e.g., the UE) might reduce the transmitting window size; on the other hand, if the packet loss are mainly caused by the radio interference, the transmitting side might keep the transmitting window size the same.

According to further exemplary implementations, for HBH ARQ, the congested intermediate node may utilize the information given by the end node (the IAB Donor) to change its aggregation policy to minimize the impact of the congestion. The information given by the IAB Donor is carried through the F1-AP interface, and indicates the latency of a certain service type increased quite a lot. Then, the congested intermediate node may decide to aggregate the data bearers based on service type, and only focuses/prioritizes on the transmission of the aggregated bearer of a certain service type.

Further Aspects

According to a first aspect, a user equipment is provided, which comprises a transmitter which transmits at least one data packet based on a transmitting window having a transmitting window size. The UE comprises a receiver which receives reception feedback regarding the at least one transmitted data packet. The UE comprises processing circuitry which determines, based on at least the received reception feedback, whether to change the transmitting window size for the transmitting window to be used at least for transmitting further data packets.

According to a second aspect provided in addition to the first aspect, the transmitter transmits further data packets based on the transmitting window having the changed transmitting window size, in case the processing circuitry determined to change the transmitting window size.

According to a third aspect provided in addition to the first or second aspect, the at least one data packet is transmitted over a radio link directly to a base station that is the serving base station of the user equipment, and the reception feedback is received from the base station.

Alternatively, the at least one data packet is transmitted to a first intermediate node of a data traffic route having at least two hops. The data traffic route further comprises the user equipment as the source node and a receiving entity as the destination node. The data is transmitted by the user equipment to the first intermediate node that is next to the user equipment and forwarded by the first intermediate node towards the destination node. In one optional implementation, the reception feedback is received from the first intermediate node and indicates whether the at least one data packet was received correctly or not by the destination node, or in another optional implementation the reception feedback is received from the first intermediate node and indicates whether the at least one data packet was received correctly or not by the first intermediate node.

According to a fourth aspect provided in addition to any of first to third aspects, the processing circuitry when determining whether to change the transmitting window size:
  determines to increase or decrease the transmitting window size based on the positive and/or negative acknowledgements determined for the data packets previously transmitted by the user equipment.

In one optional implementation, the transmitting window size cannot be increased above a maximum transmitting window size, and in another optional implementation the transmitting window size cannot be decreased below a minimum transmitting window size.

According to a fifth aspect provided in addition to the fourth aspect, the processing circuitry when determining to increase or decrease the transmitting window size:
  determines to increase the transmitting window size in case:
    a number of positive acknowledgments are received within the reception feedback for data packets previously transmitted by the user equipment, the number of positive acknowledgments referring to continuous data packets, and/or
    a number of positive acknowledgements are received within a defined period of time, and/or
    the percentage of positive acknowledgements compared to the number of transmitted data packets is above a threshold, determines to decrease the transmitting window size in case:
    a number of negative acknowledgements are received within the reception feedback for data packets previously transmitted by the user equipment, the number of negative acknowledgments referring to continuous data packets, and/or
    a number of negative acknowledgements are received within a defined period of time, and/or
    the percentage of negative acknowledgements compared to the number of transmitted data packets is above a threshold.

According to a sixth aspect provided in addition to any of the first to fifth aspects, the transmitting window is used by the user equipment to determine which data packets to transmit, In an optional implementation, the processing circuitry determines that a data packet can be transmitted in case said data packet is associated with a sequence number that is inside the transmitting window and determines that a data cannot be transmitted in case said data packet is associated with a sequence number that is outside the transmitting window.

According to a seventh aspect provided in addition to any of the first to sixth aspects, the receiver receives a configuration message to configure the user equipment whether to start the mechanism of changing the transmitting window size based on the reception feedback. In an optional implementation the configuration message is received from the serving base station of the user equipment, the serving base station being the destination node of the data traffic route.

According to an eighth aspect provided in addition to any of the first to seventh aspects, the reception feedback is a status report indicating a positive or negative acknowledgement for the previously transmitted at least one data packet. In an optional implementation, the reception feedback is transmitted as part of an Automatic Repeat reQuest, ARQ; mechanism used between the user equipment and the receiving side to implement a transmission error correction based on retransmitting negatively acknowledged data packets. In one optional implementation, the ARQ mechanism is part of the Radio Link Control, RLC, layer.

According to a ninth aspect provided in addition to any of the first to eighth aspects, the processing circuitry starts an acknowledgment timer for each of the transmitted at least one data packet. The processing circuitry stops the acknowledgment timer when receiving the reception feedback for the respective data packet. Upon expiry of the acknowledgment timer, the processing circuitry determines that the respective data packet was not correctly received by a receiving side and optionally determines to retransmit the respective data packet determined to not have been correctly received. In one optional implementation, the determination that the respective data packet was not correctly received is used as a negative acknowledgment when determining whether to change the transmitting window size for the transmitting window.

According to a tenth aspect provided in addition to the ninth aspect, the receiver receives, from the serving base station of the user equipment, a configuration message including information to configure the value of the acknowledgment timer. In one optional implementation, the value of the acknowledgment timer is proportional to the number of hops of the data traffic route between the user equipment as the source node and the destination node of the data traffic route. In one optional implementation, the value of the acknowledgment timer depends on the service type associated to the at least one data packet transmitted by the user equipment.

According to an eleventh aspect provided in addition to any of the first to tenth aspects, the processing circuitry determines whether at least one trigger condition triggers the transmission of a reception feedback request to the receiving side to transmit the reception feedback for the transmitted at least one data packet. The at least one trigger condition comprises at least one of the following:

at least a number of data packets have been transmitted after the last reception feedback request, at least a number of bytes of data have been transmitted after the last reception feedback request, expiry of a reception feedback request timer that indicates the time after the last reception feedback request was transmitted.

The processing circuitry considers the transmitting window size used by the user equipment for transmitting data packets when determining whether at least one of the trigger condition triggers the transmission of the reception feedback request.

According to a twelfth aspect in addition to any one of the first to eleventh aspects, the at least one data packet is transmitted to a first intermediate node of a data traffic route having at least two hops. The data traffic route further comprises the user equipment as the source node and a receiving entity as the destination node. The receiver receives congestion information with the reception feedback for previously transmitted data packets, the congestion information indicating that at least one of the nodes of the data traffic route suffers from data congestion. The processing circuitry controls the transmitter to transmit less data packets for a period of time. In an optional implementation, the congestion information within the reception feedback is one bit. The congestion information is interpreted from a pattern in the reception feedback, such as the distribution of acknowledgements.

According to a thirteenth aspect, a method is provided comprising the following steps performed by the user equipment. At least one data packet is transmitted based on a transmitting window having a transmitting window size. Reception feedback regarding the at least one transmitted data packet is received. It is determined, based on at least the received reception feedback, whether to change the transmitting window size for the transmitting window to be used at least for transmitting further data packets.

According to a fourteenth aspect, a serving base station is provided. A transmitter of the serving base station transmits at least one data packet based on a transmitting window having a transmitting window size. A receiver of the serving base station receives reception feedback regarding the at least one transmitted data packet. A processing circuitry of the serving base station determines, based on at least the received reception feedback, whether to change the transmitting window size for the transmitting window to be used at least for transmitting further data packets.

According to a fifteenth aspect provided in addition to the fourteenth aspect, the serving base station is an IAB, Integrated Access & Backhaul, donor, optionally wherein the IAB donor is a source node in a downlink data traffic route in which a user equipment is a destination node of the data and in which there is at least one intermediate IAB node.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment, comprising:
a transmitter, which in operation, transmits at least one data packet within a transmitting window having a transmitting window size, the transmitting window size determining how many data packets are transmitted;

a receiver, which in operation, receives reception feedback including positive acknowledgements and negative acknowledgements regarding the at least one transmitted data packet; and processing circuitry, which in operation, determines, based on at least the received reception feedback, whether to change the transmitting window size for the transmitting window to be used at least for transmitting further data packets, wherein the processing circuitry, based on a number of the negative acknowledgements received by the receiver exceeding a predetermined threshold, determines whether to decrease the transmitting window size, wherein the processing circuitry, in response to receiving the negative acknowledgements which are evenly distributed, determines to decrease the transmitting window size, and wherein the processing circuitry, in response to receiving the negative acknowledgements which are continuous, determines to maintain the transmitting window size.

2. The user equipment according to claim 1, wherein the transmitter, when in operation, transmits further data packets within the transmitting window having the changed transmitting window size, in case the processing circuitry determined to change the transmitting window size.

3. The user equipment according to claim 1, wherein the at least one data packet is transmitted over a radio link directly to a base station that is the serving base station of the user equipment, and the reception feedback is received from the base station, or wherein the at least one data packet is transmitted to a first intermediate node of a data traffic route having at least two hops, the data traffic route further comprising the user equipment as the source node and a receiving entity as the destination node, wherein the at least one data packet is transmitted by the user equipment to the first intermediate node that is next to the user equipment and forwarded by the first intermediate node towards the destination node, wherein the reception feedback is received from the first intermediate node and indicates whether the at least one data packet was received correctly or not by the destination node, or wherein the reception feedback is received from the first intermediate node and indicates whether the at least one data packet was received correctly or not by the first intermediate node.

4. The user equipment according to claim 1, wherein the processing circuitry when determining whether to change the transmitting window size:

determines to increase or decrease the transmitting window size based on the positive and/or negative acknowledgements determined for the data packets previously transmitted by the user equipment, wherein the transmitting window size cannot be increased above a maximum transmitting window size, and wherein the transmitting window size cannot be decreased below a minimum transmitting window size.

5. The user equipment according to claim 4, wherein the processing circuitry when determining to increase or decrease the transmitting window size:

determines to increase the transmitting window size in case:

a number of positive acknowledgments are received within the reception feedback for data packets previously transmitted by the user equipment, the number of positive acknowledgments referring to continuous data packets; and/or a number of positive acknowledgements are received within a defined period of time; and/or the percentage of positive acknowledgements compared to the number of transmitted data packets is above a threshold;

determines to decrease the transmitting window size based on that:

a number of negative acknowledgements are received within a defined period of time; and/or the percentage of negative acknowledgements compared to the number of transmitted data packets is above a threshold.

6. The user equipment according to claim 1, wherein the transmitting window is used by the user equipment to determine which data packets to transmit, wherein the processing circuitry, when in operation, determines that a data packet can be transmitted in case said data packet is associated with a sequence number that is inside the transmitting window and determines that a data cannot be transmitted in case said data packet is associated with a sequence number that is outside the transmitting window.

7. The user equipment according to claim 1, wherein the receiver, when in operation, receives a configuration message to configure the user equipment whether to start the mechanism of changing the transmitting window size based on the reception feedback, wherein the configuration message is received from the serving base station of the user equipment, the serving base station being the destination node of the data traffic route.

8. The user equipment according to claim 1, wherein the reception feedback is a status report indicating a positive or negative acknowledgement for the previously transmitted at least one data packet, wherein the reception feedback is transmitted as part of an Automatic Repeat request (ARQ) mechanism used between the user equipment and a receiving side to implement a transmission error correction based on retransmitting negatively acknowledged data packets, wherein the ARQ mechanism is part of the Radio Link Control (RLC) layer.

9. The user equipment according to claim 1, wherein the processing circuitry, when in operation, starts an acknowledgment timer for each of the transmitted at least one data packet, wherein the processing circuitry, when in operation, stops the acknowledgment timer when receiving the reception feedback for the respective data packet, and wherein upon expiry of the acknowledgment timer, the processing circuitry, when in operation, determines that the respective data packet was not correctly received by a receiving side and determines to retransmit the respective data packet determined to not have been correctly received, wherein the determination that the respective data packet was not correctly received is used as a negative acknowledgment when determining whether to change the transmitting window size for the transmitting window.

10. The user equipment according to claim 9, wherein the receiver, when in operation, receives, from the serving base station of the user equipment, a configuration message including information to configure the value of the acknowledgment timer, wherein the value of the acknowledgment timer is proportional to the number of hops of the data traffic route between the user equipment as the source node and the destination node of the data traffic route, wherein the value of the acknowledgment timer depends on the service type associated to the at least one data packet transmitted by the user equipment.

11. The user equipment according to claim 1, wherein the processing circuitry, when in operation, determines whether at least one trigger condition triggers the transmission of a reception feedback request to a receiving side to transmit the reception feedback for the transmitted at least one data packet, wherein the at least one trigger condition comprises at least one of the following:

at least a number of data packets have been transmitted after the last reception feedback request;

at least a number of bytes of data have been transmitted after the last reception feedback request; and expiry of a reception feedback request timer that indicates the time after the last reception feedback request was transmitted, wherein the processing circuitry, when in operation, considers the transmitting window size used by the user equipment for transmitting data packets when determining whether at least one of the trigger condition triggers the transmission of the reception feedback request.

12. The user equipment according to claim 1, wherein the at least one data packet is transmitted to a first intermediate node of a data traffic route having at least two hops, the data traffic route further comprising the user equipment as the source node and a receiving entity as the destination node, wherein the receiver, when in operation, receives congestion information with the reception feedback for previously transmitted data packets, the congestion information indicating that at least one of the nodes of the data traffic route suffers from data congestion, wherein the processing circuitry, when in operation, controls the transmitter to transmit less data packets for a period of time, wherein the congestion information within the reception feedback is one bit, wherein the congestion information is interpreted from a pattern in the reception feedback, such as the distribution of acknowledgements.

13. A method comprising the following steps performed by a user equipment:

transmitting at least one data packet within a transmitting window having a transmitting window size, the transmitting window size determining how many data packets are transmitted;

receiving reception feedback including positive acknowledgements and negative acknowledgements regarding the at least one transmitted data packet;

determining, based on at least the received reception feedback, whether to change the transmitting window size for the transmitting window to be used at least for transmitting further data packets;

based on a number of the negative acknowledgements exceeding a predetermined threshold, determining whether to decrease the transmitting window size, in response to receiving the negative acknowledgements which are evenly distributed, determining to decrease the transmitting window size; and in response to receiving the negative acknowledgements which are continuous, determining to maintain the transmitting window size.

14. A serving base station, comprising:

a transmitter, which in operation, transmits at least one data packet within a transmitting window having a transmitting window size, the transmitting window size determining how many data packets are transmitted;

a receiver, which in operation, receives reception feedback including positive acknowledgements and negative acknowledgements regarding the at least one transmitted data packet; and processing circuitry, which in operation, determines, based on at least the received reception feedback, whether to change the transmitting window size for the transmitting window to be used at least for transmitting further data packets, wherein the processing circuitry, based on a number of the negative acknowledgements received by the receiver exceeding a predetermined threshold, determines whether to decrease the transmitting window size, wherein the processing circuitry, in response to receiving the negative acknowledgements which are evenly distributed, determines to decrease the transmitting window size, and wherein the processing circuitry, in response to receiving the negative acknowledgements which are continuous, determines to maintain the transmitting window size.

15. The serving base station according to claim 14, wherein the serving base station is an IAB (Integrated Access & Backhaul) donor, wherein the IAB donor is a source node in a downlink data traffic route in which a user equipment is a destination node of the at least one data packet and in which there is at least one intermediate IAB node.

* * * * *